US007795749B1

(12) United States Patent  
Weber

(10) Patent No.: US 7,795,749 B1
(45) Date of Patent: Sep. 14, 2010

(54) GRADUATING A FLOW OF TIDAL RESERVES DURING PERIODS OF TIDAL FLOOD PRODUCES UNINTERRUPTED ELECTRICAL GENERATION

(75) Inventor: Harold J. Weber, Centerville, MA (US)

(73) Assignee: Savvystuff Property Trust, Centerville Trust, MA (US)

( * ) Notice: Subject to any disclaimer, the term of this patent is extended or adjusted under 35 U.S.C. 154(b) by 0 days.

(21) Appl. No.: 12/459,873

(22) Filed: Jul. 10, 2009

Related U.S. Application Data

(63) Continuation of application No. 12/005,083, filed on Dec. 26, 2007, now Pat. No. 7,564,143.

(51) Int. Cl.
*F03B 13/10* (2006.01)
(52) U.S. Cl. ............................. 290/53; 290/42; 60/398
(58) Field of Classification Search .................. 290/42, 290/53; 60/398
See application file for complete search history.

(56) References Cited

U.S. PATENT DOCUMENTS

| | | | | | |
|---|---|---|---|---|---|
| 1,533,234 | A | * | 4/1925 | Damiano | 405/77 |
| 1,785,896 | A | * | 12/1930 | Defour | 405/77 |
| 1,868,087 | A | * | 7/1932 | Blair | 405/76 |
| 2,044,686 | A | * | 6/1936 | Harrison et al. | 405/76 |
| 2,342,223 | A | * | 2/1944 | Robertson | 415/66 |
| 2,566,447 | A | * | 9/1951 | Griswold | 185/29 |
| 3,426,540 | A | * | 2/1969 | Fixel | 405/77 |
| 3,974,395 | A | | 8/1976 | Bright | 290/44 |
| 4,141,670 | A | * | 2/1979 | Russell | 415/3.1 |
| 4,263,516 | A | * | 4/1981 | Papadakis | 290/53 |
| 4,859,866 | A | * | 8/1989 | Horne et al. | 290/54 |
| 5,686,766 | A | | 11/1997 | Tamechika | 307/43 |
| 6,969,925 | B2 | * | 11/2005 | Desy et al. | 290/54 |
| 7,040,089 | B2 | * | 5/2006 | Andersen | 60/398 |

OTHER PUBLICATIONS

U.S. Appl. No. 12/005,083, filed Dec. 26, 2007, Waks, Joseph.

* cited by examiner

*Primary Examiner*—Joseph Waks

(57) ABSTRACT

Oceanic tidal energy sources hydroelectric generating system coupled to a primary tidal reservoir through a bi-directional tideway exciting a primary turbine as a diurnal cycle tide waxes and wanes. A secondary tidal reservoir includes a tideway and secondary turbine with flow modulated by a gradated control of a sluice gate to proportionately blend reserve tidewater capacity of the secondary tidal reservoir as a delayed resource of virtual tidal influx and reflux. An aggregate summation of tidal energy acting upon the turbine driven generators delivers a constant flow of electric power throughout the diurnal tidal cycle. A tertiary tidal reservoir operating in alternation with the secondary tidal reservoir optimizes the secondary turbine drive during slack-tide. Shunting excess tidal energy around the turbines during periods of reduced power-demand supplements tidal resources in subsequent phases of the diurnal tidal day when solar-day related power-demand may increase.

20 Claims, 27 Drawing Sheets

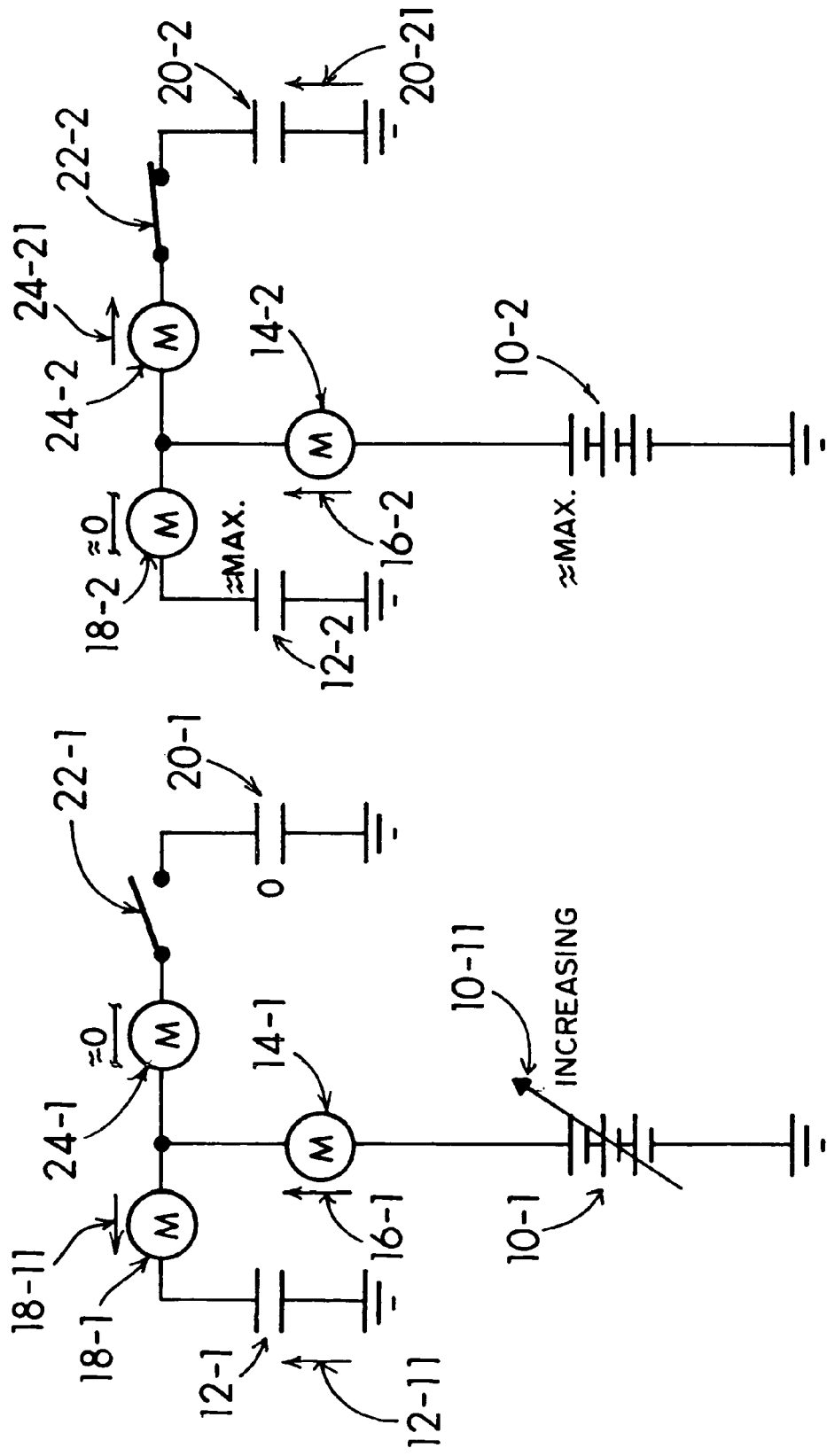

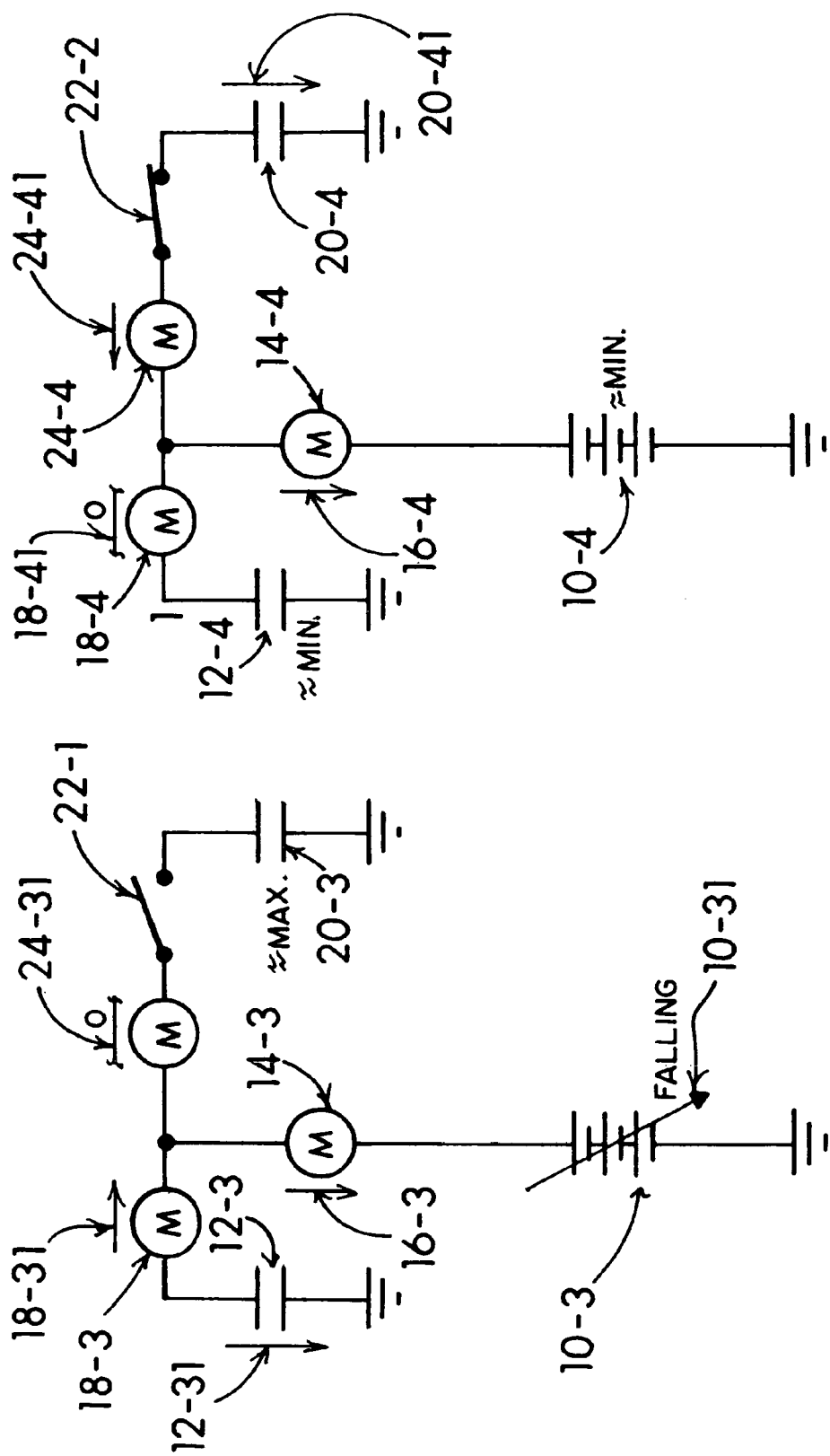

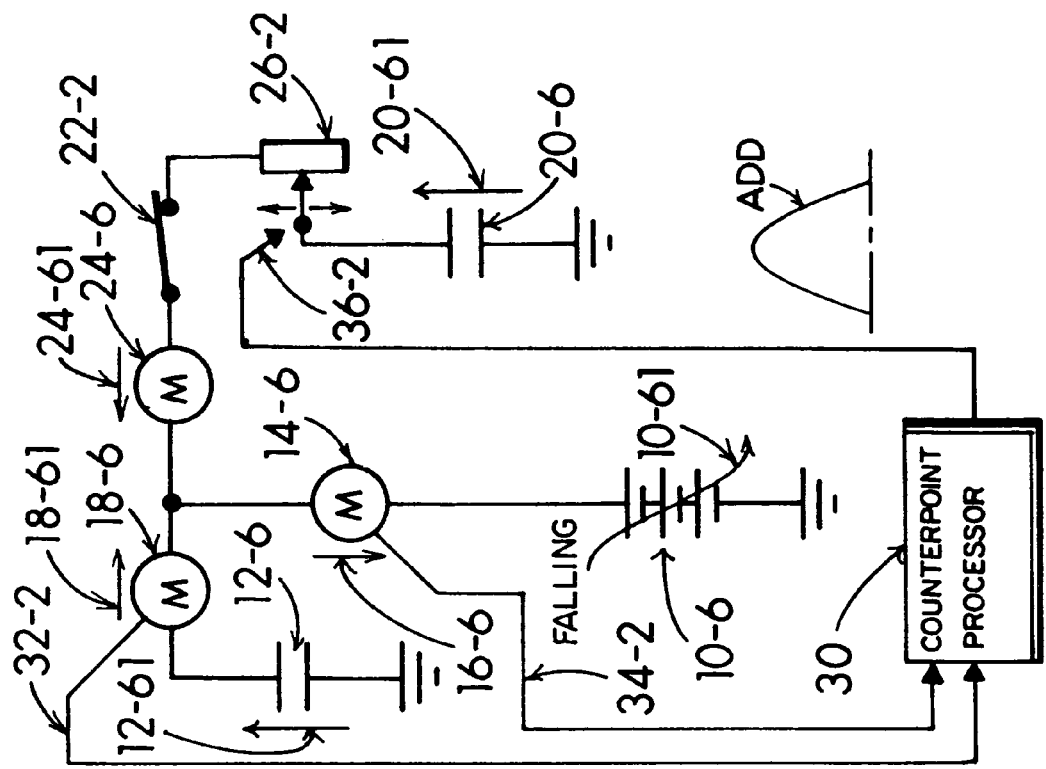
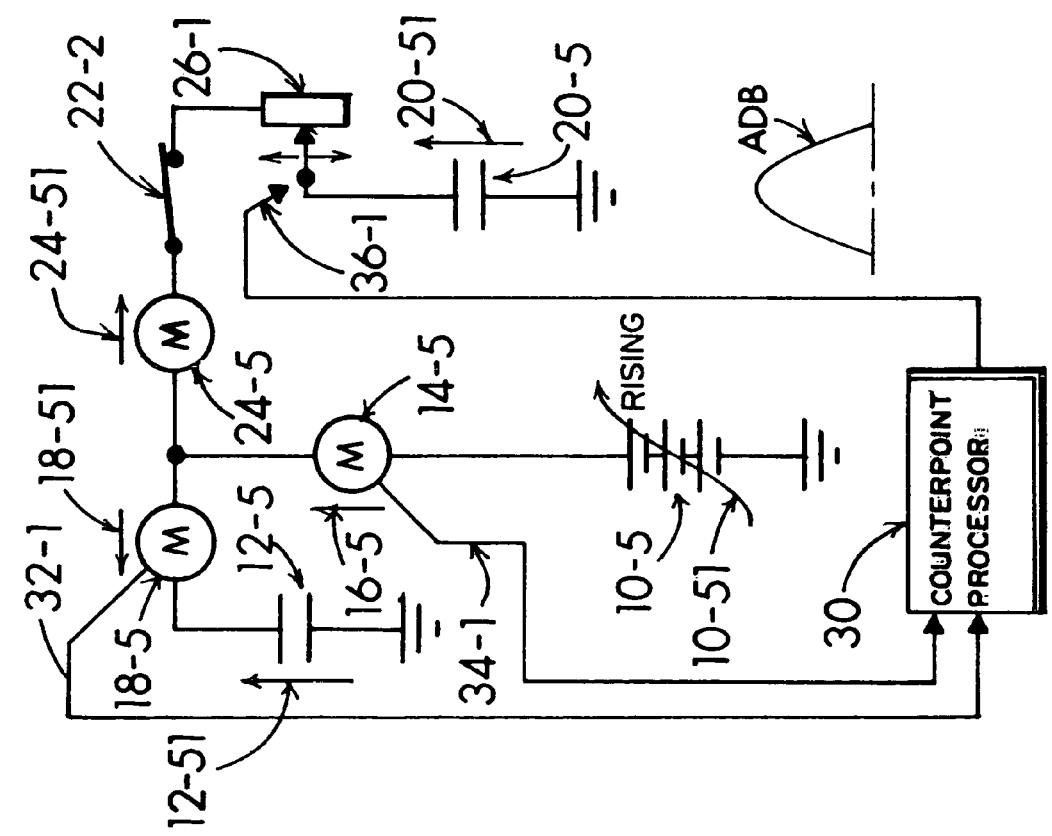
Fig. 6
Fig. 5

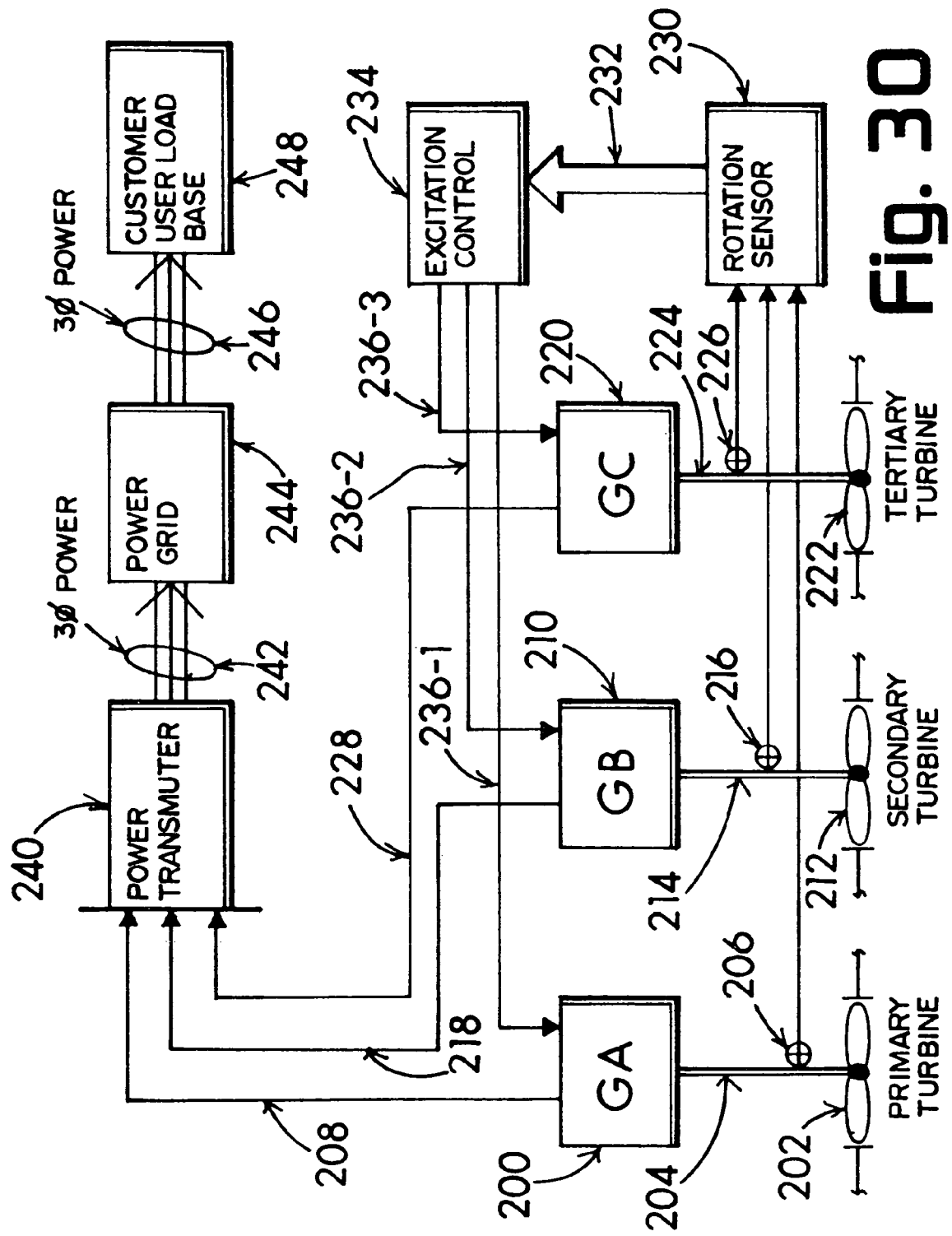

GRADUATING A FLOW OF TIDAL RESERVES DURING PERIODS OF TIDAL FLOOD PRODUCES UNINTERRUPTED ELECTRICAL GENERATION

CROSS-REFERENCE TO RELATED APPLICATION(S)

This application claims priority from and is a CONTINUATION of U.S. patent application Ser. No. 12/005,083, filed 26 Dec. 2007 now U.S. Pat. No. 7,564,143. The prior Ser. No. 12/005,083 application, including the entire written specification and drawing figures are presently duplicated in this application.

FIELD OF INVENTION

My invention generally pertains to a hydroelectric generating system utilizing turbines to capture latent energy from a natural bi-directional flow of oceanic tidal currents. More particularly it pertains to obtaining a constant level of turbine excitation throughout the influx, reflux and two slack-water portions of a diurnal tide-cycle.

INVENTION SYNOPSIS

In my invention's operating scenario, a turbine apparatus combines to utilize a predictable inflow and outflow of a tidal current to drive one or more generators and produce a steady flow of electricity throughout the tidal current's usual diurnal cycle. During tidal current inflow a primary turbine apparatus is driven by a rising tide's floodstrength current passing through a primary tideway and entering a tidal basin or estuary maintained as a primary reservoir behind a barrage. An onset of a slack before ebb urges a regulated opening of a regulator gate to enable an artificial tidal inflow current into a lower-level secondary reservoir basin or collateral estuary through a secondary tideway including a secondary turbine. A sufficient resumption of an ebb tide enables an outflow ebb strength current to exhaust from the primary reservoir and through the primary tideway to again be utilized by the primary turbine, together with a proportioned closure of the secondary reservoir's regulator gate. During the period of slack tide before flood an artificial tidal outflow current increasingly flows forth from the stored higher-level of the proportionately un-gated secondary reservoir basin's reserves through the secondary turbine for the duration of the ebb tide slack time. Finding a resumption of the flood current after ebb slack serves to again control closure of the secondary reservoir's regulator gate, preserving its lowered capacity for receiving the artificial tidal inflow current once high tide slack water occurs. The to-and-fro action of the tidal flood and ebb serves to deliver energy from the primary turbine and generator while energy flow during the tidal slack periods is supplied by the control of artificial outflow and inflow tidal currents created by an emptying and filling of the secondary reservoir through a timely control of the regulator gate. The resulting artificial tidal current is utilized to drive the secondary turbine and generator thereby maintaining a substantial uniformity of overall power production. The overall performance is embellished by the modulated opening and closing of the regulator gate in the secondary tideway in proportion to an immediate measured level of tide drift through the primary tideway. The proportionated regulator gate operation results in a nearly steady exchange of water flow-rate through the turbine apparatus thereby enabling a stable and about constant delivery of electrical power by the turbine driven generator system throughout a full diurnal cycle of operation.

A usage-history based prediction of electrical power demand may be formulated and the resulting determination may be utilized to shunt some of the oceanic tidal flow around the turbine apparatus during periods of lessened demand, thereby assuring full capacity availability later in a diurnal cycle when demand may predictably increase. Knowing that the diurnal cycle does not coincide with a solar day it is clearly advantageous that peak electrical demand relative with the periods of maximal tidal drift may be controllably skewed by a determinable extent from day to day. The problematical non-synchronous relationship between tidal drift and electrical demand beget the technique unveiled by this invention for migrating some of the tidal water capacity around the turbine apparatus during periods of lowered demand allows for full capacity operation to be available during periods of increased demand.

BENEFITS OF INVENTION

Of all the sources of renewable power generation, hydroelectric power has long been recognized as the most dependable. In contrast to wind power with it's erratic and unpredictable non-cyclic behavior, water power may be reliably managed to be steady and predictably available throughout a 24 hour day. This invention efficiently captures oceanic tidal flow energy as a hydrodynamic source and conveys a teaching that adapts the cyclic nature of tidal drift into a commercially viable source of virtually constant hydroelectric power generation.

A main goal and hence a key benefit to a user of my invention presently pertains to a capability for utilizing the natural flow of tidal energy as a source of essentially unlimited and recoverable hydrodynamic energy harnessed for generating environmentally-clean electricity. Tidal energy is inherently non-polluting and clean in that no nasty byproducts or unnatural emissions are released into the habitat or atmosphere by it's utilization. Tidal energy itself is primarily derived from the cognate gravitational interaction between the planet earth, earth's moon and the Sun and is therefore a long-known cyclic "constant" with measurably knowable parameters and predictable behavior. The cyclic nature of tidal energy leads to a nearly sinusoidal presentation of power potential during a tidal day. This invention addresses the natural characteristics and serves to better "average-out" the crest and valley character of tidal energy cycle into a more dependable and continuous source of economically feasible electricity that may "best fit" the irregular commercial needs of a solar day of energy demand activity.

PROBLEM SOLVED BY INVENTION

Tidal energy is known as a nonpolluting naturally occurrent renewable source of energy having a minimal impact on the earth's environmental habitat. Man is well known to have ever-increasing energy needs. In today's world, most of these needs are met by hydroelectric damming of rivers, fossil fueled power stations (e.g., oil, coal or natural gas fired generator systems), nuclear power stations and, to a lesser extent, by geothermal power and wind driven turbines. Tidal energy has heretofore seen limited application because in it's rudimentary form it suffers from inherently producing non-uniform albeit cyclical surges of energy delivery during only about ten hours of the tidal-day. Although duration of flood tide rise and duration of ebb tide fall is ordinarily a predictable diurnal cycle, there is little if any correlation between the tide day cycle and a solar day's commercial demand cycle for electricity. As a result other means such as fossil fueled power stations are necessary fill-in during times of tidal slack water.

Having a diurnal (tide day) cycle of calculable magnitude and timing is remarkably superior to sporadic climatic variations deleteriously affecting wind-power or even solar-cell power that are known to suffer from unpredictable surges that often outstrip immediate customer demand. Tidal occurrence is inherently less remarkably affected by "natural disturbances" such as hurricanes, inclement weather, wild fires, volcanic ash spewed into the atmosphere or other sporadic disturbances that are likely to disrupt other sun or wind based sources of renewable energy. Even the eventual labor-intensive production of ethanol as a source of quasi-renewable energy is highly dependent upon a non-failing and consistent production of stock-crops used for the distillery process.

A primary advantage of oceanic tide energy management is that latent energy intrinsic to oceanic tide may be temporarily stored-up and subsequently utilized when tidal slack occurs. In an analogical sense, this is comparable to storing excess energy in a capacitor and then recovering the latent energy to average-out an overall systematical power flow in a controllable proportion to load demand. This invention furthermore teaches a practical utilization of an artificial tidal flow during the usual diurnal slack time to maintain a nearly constant source of energy. It advances the art by modulating the "store" of energy capacity for metered release as a delayed tidal current having a predetermined reserve of latent energy capacity. The result is an optimal flow of tidal drift current through the turbine apparatus that best reflects the immediate demands of the solar day of commercial energy consumption. The extent of this compensatory energy capacity modulation may be extended to differ throughout the usual week of solar days and even corrected for special variations such as likely increased air conditioning usage during periods of hot weather, demand reduction due to a holiday, and similar measurable or predictable events.

I show how the time-skewed or cyclic phase delay of a utilization of the secondary tidal source reserve may be controllably blended with the primary tidal source to deliver what amounts to an about constant level of the turbine energy and generator performance thereby yielding a nearly steady supply of electrical power.

Adapting to Portable Energy Needs

A large-scale replacement of the vehicular fleet with "electric" cars and trucks in order to obtain better fuel economy does little to overcome the basic energy problem. Electric vehicles merely shift an inherent problem to another business sector. The gas or diesel sloshing around in the vehicle's "gas tank" becomes a requirement for similar energy-equivalent quantities of "fuel" at a central location, for example the fossil-fuel fired electric generating station. In an electric (or hybrid) vehicle, the electric power is obtained from a battery that must be regularly "charged-up" from a stationary source. This is to say that every kilowatt of electricity demanded for propelling an electric vehicle must be generated somewhere by some usually stationary power station apparatus. It is known that, at the time of this invention, a bulk of this electricity is generated by non-renewable resources, such as coal, oil or natural gas. Hence the thesis that under current art, electric cars merely shift the inherent energy distribution problem from the mobile fuel supplier to the stationary fuel supplier business sector.

Energy produced by this invention's tidal power generator implementation may be commercially distributed and delivered to provide a source of battery charge-up current flow for many vehicles. Dependence upon tidal currents produces an almost perpetual source of energy that is cyclic and predictable and fully applicable to the needs of vehicular battery recharge without directly or indirectly contributing to the deleterious effects of global warming and consumption of vital organic commodities that might be better utilized for other purposes, such as animal or human food.

SUMMARY OF INVENTION

A new level of tidal energy capture and utilization is a poignant aspect of my invention's teachings. In essence, it converts the energy component from a measured flood and ebb portion of a contained primary tidal current flow into hydroelectric power. During two interposed periods of tidal drift slackening, a secondary provision for maintaining a virtual tidal current is implemented to maintain a manageably even flow of hydroelectric power from the system. Relative with the quasi-sinusoidal measure of the natural oceanic tide-cycle of the primary tide, the virtual tidal current technically appears as though it were a phase-delayed or time-shifted tide blending with the primary tide and acting to smooth-out the natural dips in the primary tide's drift energy release during quarterns of slack tide.

Main Turbine Drive

This invention is exercised by providing two tidal basin reservoirs partially contained by a barrage. A primary basin is allowed to ordinarily fill and empty from the oceanic tidal source through a primary tideway, with the bidirectional tidal current set providing hydrodynamic energy for driving a primary (main) turbine apparatus.

First Augmentation Event

A separate augmentative secondary basin (having previously been lowered) is held-back from filling through a secondary tideway channeled with the oceanic tidal source. Drift set through the secondary tideway is managed by a regulatory sluice. When the main basin's tideway flood strength is sufficient to fully drive the primary turbine apparatus the regulator gate is closed. As the current drift through the main basin's tideway wanes preceding the period of after-flood slack current, the regulator gate is gradually opened allowing a continued influx of a delayed tidal current through a secondary tideway coupled between the oceanic source and the secondary basin. The gradation of regulator gate's opening is proportioned to about match the decrease in the tide drift through the primary tideway with a corresponding increase in the delayed tide drift through the secondary tideway.

The invention instructs the advantageous dynamic measurement of the primary tideway current and proportionately opening the regulator gate so as to increase the tidal flow through the secondary tideway as the tidal flow measure through the primary tideway wanes.

Event Continuations

During the after-flood slack portion of the first augmentation event the inflow of the secondary tidal flood allowed by the gradually opened regulator gate serves to mostly fill the secondary basin concurrent with utilizing the secondary tidal drift through the secondary tideway to drive the secondary turbine apparatus and produce viable power during the interval of the waning and slack flood tide. As the tide begins to ebb, the ebbing outflow current once again serves to drive the primary turbine apparatus until an onset of the after-ebb slack-water condition is reached.

Second Augmentation Event

The separate secondary basin is mostly filled during the period of secondary tidal flood allowed by opening the regulator gate during the period of after-flood slack water. This filling occurs during the earlier described First Augmentation Event. The secondary tideway's regulator gate is gradually closed in proportion an a marked increase in the primary tideway's ebb-tide's current flow. The regulator gate is fully closed once the primary ebb drift is sufficient to drive the primary turbine apparatus from the primary basin's reserves flowing into the ebbing oceanic source. Upon a waning of the ebb drift, the secondary tideway's regulator gate is again gradually opened and the held-back water in the augmenter basin proportionately flows-forth to create the delayed ebb-tide flow which routes through the secondary tideway to effectively drive the secondary turbine apparatus for the duration of the after-ebb slack.

The invention further reveals a continuance of the dynamic measurement of the primary tideway current and proportionately closing the regulator gate so as to decrease the tidal flow through the secondary tideway as the tidal flow measure through the primary tideway waxes.

Compensatory Events

By a programmed determination of the graduated opening and closing sequence of the secondary tideway's regulator gate a resulting control of the secondary tideway's current serves to maintain an overall uniformity of hydroelectric power production. A proportional closing of the regulator gate during periods of the oceanic source's flood inflow and ebb outflow exceeding a threshold of current speed diverts the tidal energy to principally operate the primary turbine through the tidal currents exchanged through the primary tideway. As the tide-cycle continues, the opening of the regulator gate on the secondary basin may ramp-up the secondary tideway tidal exchange in proportion to a waning of the speed of current flow through the primary tideway. As a result, the secondary turbine output may gradually increase in near-proportion to a measurable decrease in the primary turbine's energy delivery as waning of the oceanic tide flood and ebb drift occur. The proportionated operation of the regulator gate serves to maintain a nearly constant level of hydrodynamic energy conversion through the turbine apparatus so the overall hydroelectric production may be maintained at a nearly constant level, independent from natural oceanic tide drift variations known to occur during the diurnal tide-cycle.

WHAT THIS INVENTION "IS" AND "IS-NOT"

This invention "is not" about a turbine drive system limited to operation only during the interval of substantial flood current flow and ebb current flow.

This invention "is not" about utilizing another non-tidal energy source to fill-in during the periods of after-ebb slack water and after-flood slack water.

This invention "is" about providing a second barraged tidal containment basin having a tideway guarded by a regulator gate to gradate the tide drift parameters in about inverse proportion to the measure of tidal drift through a primary tideway coupled between the oceanic tidal source and a primary tidal basin to achieve an overall summation of tidal drift rate through the two tideways that is nearly constant although not necessarily in the same direction.

This invention "is" about an apparatus which defers a proportional utilization of a portion of the ebb-tide and flood-tide potential until the onset of slack-tide occurs. This enables about a constant flow of the hydrodynamic energy through the turbines.

This invention "is" about converting the predictably cyclic inflow and outflow of oceanic tides into a near uniform source of hydroelectric energy.

This invention "is" about a hydroelectric tidal energy system that may be economic on various scales of magnitude and at various locales.

This invention "is" about servicing a third barraged tidal containment basin having a second regulator gate controlled third tideway for reserving tidal energy from periods of diminished energy usage to be available during periods of increased energy usage.

OBJECTIVES OF INVENTION

An objective of my invention is to produce hydroelectric energy from tidal currents produced through a tideway by a naturally occurring tidal rise and fall.

A key purpose for my invention is to availiate a primary and at least one secondary tidal current flow controllably phase-lagging the primary tidal current flow.

A purpose of my invention is to manage a diurnal cycle of tidal current so as to deliver a primary range of current drift and a subsequentially delayed secondary range of current drift that may act upon the turbine apparatus to maintain a continuous output of the hydroelectric energy throughout the full diurnal tide-cycle.

A gist of my invention is to establish at least two tidal basins, including a primary basin continuously flooded and ebbed by the diurnal tide-cycle and a secondary basin having a barrage ported by a regulator gate which is controlled so as to create a secondary tidal current flow through a secondary tideway.

A further gist of my invention is to proportionately delay a metering of the secondary tidal current flow through the secondary tideway so as to compensate the waning and waxing of the oceanic tidal currents through the primary tideway.

A preferred implementation of my invention dynamically measures the tidal drift rate through the primary tideway and determines an proportional extent of an opening or else closing of the regulator gate to modulate the tidal drift rate through the secondary tideway to achieve an about constant summation of tidal drift energy channeled through both tideways and driving the turbine apparatus.

The spirit of my invention is to utilize the profoundly cyclic and bidirectional oceanic tidal flow to establish a continuous source of hydroelectric power.

A further goal is to adaptively utilize the tidal current flow as an efficient and renewable source of commercially viable continuous hydroelectric energy.

It is an important intent to provide the advantages producing hydroelectric power during the inrush of tidal flooding and outflow of tidal ebbing combined with controllably delaying the dissipative usage of a portion of the available tidal energy in a proportionately metered manner to avail a continued tidal energy capability during periods of the oceanic source tide waning, waxing and slack.

Yet another consideration of my invention is to adapt oceanic tide energy to unfailingly deliver a nearly constant source of hydroelectric power throughout a diurnal tide-cycle.

My invention intends that range of tidal flow be managed by skewing and graduating phase and magnitude of a utilization of a portion of the tidal rise and fall energy for maintaining a nearly constant level of hydroelectric production during the periods of slack water.

A remaining synergistic object of this invention is to manage the tidal inflow and outflow to match the cyclic variations in loading placed on the hydroelectric generators as related to varying periods and levels of commercial usage demand throughout a solar day.

DESCRIPTION OF DRAWINGS

My invention is depicted by 26 sheets of drawings showing 30 figures, including:

FIGS. 1-6—Equivalent electrodynamic representations of my invention.

FIG. 30—Utilizing turbine speed determination to maintain optimal generator performance.

DESCRIPTION OF INVENTION

Figure 7:
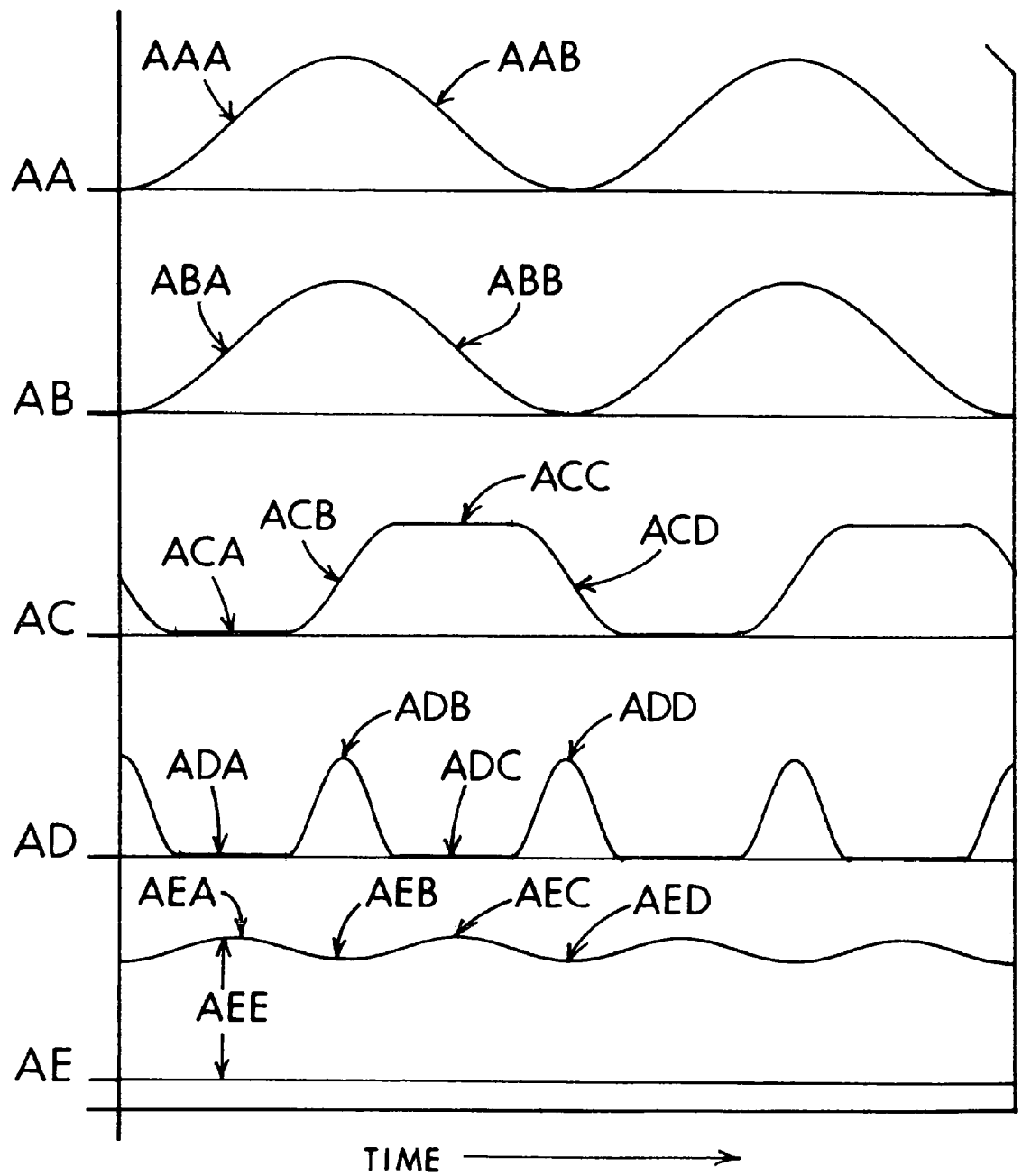
FIG. 7—Waveforms attendant with the presentations of FIGS. 1-6.

I have broken my invention's description down into several separate discussions and subsets of illustrative drawing figures to better express the novel intent and scope of the subject matter.

Electrodynamic Analogy

My invention may be comparatively over-viewed as an operational tidal energy based hydrodynamic system through an analogous use of electrical network symbology. A initial 90-degrees of a rising oceanic tide may be represented 10-1 in FIG. 1 by an increasing 10-11 source of DC power (or "variable battery") with current flowing forth 16-1 through a primary current-flow driven motor (or current meter) 14-1. The source 10-1, a meter 14-1 together with a current-driven motor 18-1 and a primary capacitor 12-1 forms a series circuit arrangement with the current flow 16-1 increasing 12-11 the charge stored in the primary capacitor 12-1. The result of the current flow 18-11 through the motor 18-1 induces the motor to deliver mechanical energy. In the context of my invention, later explained in explicit detail, the motors may be viewed as analogous to hydrodynamic turbines that drive generators (not shown). Hence as the increasing current 16-1 represented on the meter 14-1 flows until the battery 10-1 increase 10-11 representing an inflowing tide reaches a plateau or "slack-tide" level. The increase of the battery potential is predicated as a leading 90-degrees of a full 360-degree cycle simulating a diurnal tidal cycle in waveform, if not in time. As a result of the switch (impeder) 22-1 being "open", no current flows through the secondary motor 24-1 to the secondary capacitor 20-1. An "open" switch in the electric circuit is analogous to a closed gate in a waterway: e.g, it stops the current flow.

When the maximum battery level nears about 72% of the maximum level, representing an onset of a second quarter cycle period (i.e., high slack tide) and a cessation of current flow through the motor 18-1, the switch 22-1 closes 22-2 in FIG. 2 to enable a substantial charging current to flow into the charge starved secondary capacitor 20-2. As the charge is allowed to accumulate 20-21 the necessitous current flow 24-21 excites operation of the secondary motor 24-2 as may be measured 16-2 on a meter 14-2.

Regulating current flow in either branch of this representative hookup, allows the charge-time 12-11, 20-21 for the capacitors 12-2, 20-2 to be managed to approximate the interval during which the increase 10-11 occurs both before and while the switch 22-2 is closed.

During the third quarter-cycle, the battery 10-3 level 10-31 falls as shown in FIG. 3 preferably with a decreasing sinusoidal level and upon reaching a predetermined level the secondary impeder 22-1 is opened, thereby retaining the maximal charge accumulated in the capacitor 20-3 and negating current flow 24-31 through the motor, while the capacitor 12-3 discharge 12-31 continues producing a current flow 18-31 exciting the primary motor 18-3 with the current 16-3 flow measured on the meter 14-3.

When the falling battery level approaches a predetermined minimum virtual slack-tide level, the switch 22-2 of FIG. 4 closes allowing the stored energy retained in the capacitor 20-4 to discharge 20-41 as a current flow 24-41 through the motor 24-4. As the motor 24-4 is excited during the period while the motor 18-4 current flow is null and the capacitor 12-4 is mostly discharged.

A rising and falling battery level AA is depicted in FIG. 7 and hereinafter described in association with FIG. 5 and FIG. 6.

A nearly constant level of current flow 16-5 through the meter 14-5 of FIG. 5 is provided by allowing the rising 10-51 battery 10-5 level AAA to flow 18-51 through ABA the motor 18-5 on it's path to charging 12-51 the primary energy reservoir capacitor 16-5. During this initial (about first quarter-cycle) period the switch 22-2 is maintained OPEN, similar to the showing of FIG. 1. When the battery 10-5 rises to near a full level (approaching onset of the second quarter-cycle) the switch 22-2 closes and a flow 24-51 is established ACB from a lower level ACA to a higher level ACC through the secondary motor 24-5 as a charging 20-51 of a secondary energy reservoir capacitor 20-5 commences. FIG. 5 depicts a variable impeder (rheostat) 26-1 that may be controlled by a counterpoint processor 30 to sample 32-1,34-1 the primary reservoir current flow and adjust the rheostat 26-1 in accord with a function ADB to modulate the charging current flow 24-51 through the motor 24-5 so the combined work-function (energy) delivered by the motors 18-5 and 24-5 is about constant AEA,AEB during the waxing half of the operational cycle.

Conversely a falling AAB battery 10-6 level 10-61 of FIG. 6 initially produces substantial current flow 18-61 through the motor 18-6 as the capacitor 12-6 charge ABB decreases 12-61. During this initial (about third quarter-cycle) period, the switch 22-2 is held OPEN, similar to the showing of FIG. 3 and the stored level ACC is maintained. Once the battery 10-6 level falls below a predetermined level approaching the fourth quarter-cycle, the switch 22-2 closes like in FIG. 4 and the energy reservoir capacitor 20-6 discharges ACD it's stored energy retained from the charge it received when practiced according to FIG. 5 teaching. Once again, the counterpoint processor 30 samples 32-2,34-2 the primary currents and determines a control signal 36-2 in accord with a function ADD to modulate the discharge 20-61 current flowing through the motor 24-6 so the combined work-function (energy) delivered by the motors 18-6 and 24-6 remains about constant AEC,AED during the waning half of the operational cycle.

Hydrodynamic Embodiment

Figure 8:
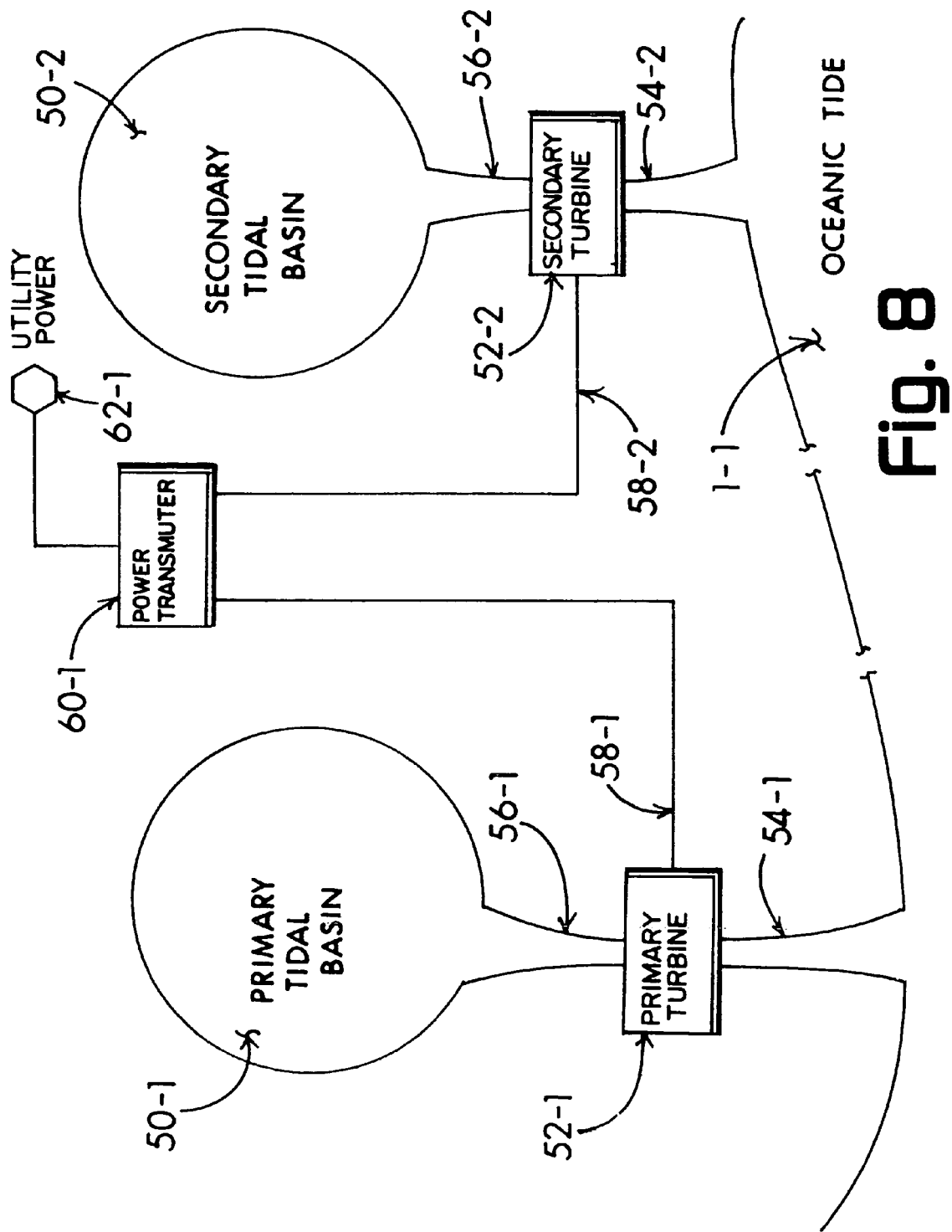
FIG. 8—Overview of a tidal facility showing two tidal basins having tideways connected with an oceanic tide source.

A tidal energy conversion system, practiced upon the principles taught by this invention, may be generally configured in accord with the showing of FIG. 8. Two separate tidal basins are utilized. These may be bodies of water enclosed by a barrage or dam, or else a natural estuary. In any event, the tidal basins are lake-like in character. A primary tidal basin 50-1 may have a bidirectional inlet 54-1,56-1 coupled through a primary turbine 52-1 with an oceanic tidal source 1-1. Additionally, a secondary tidal basin 50-2 is similarly coupled with the oceanic tide through the bidirectional inlet 54-2,56-2 as coupled through a secondary turbine 52-2. The turbines 52-1,52-2 may each include a generator (not shown) which delivers energy 58-1,58-2 to a power transmuter 60-1 which conditions the energy to deliver utility power 62-1 to a user base. This map-like depiction shows the generalized embodiment that my invention may embody to readily accommodate a civil engineering effort to fit the invention's teaching to local terrain or sea-coast conditions.

Presentment I

Figure 9:
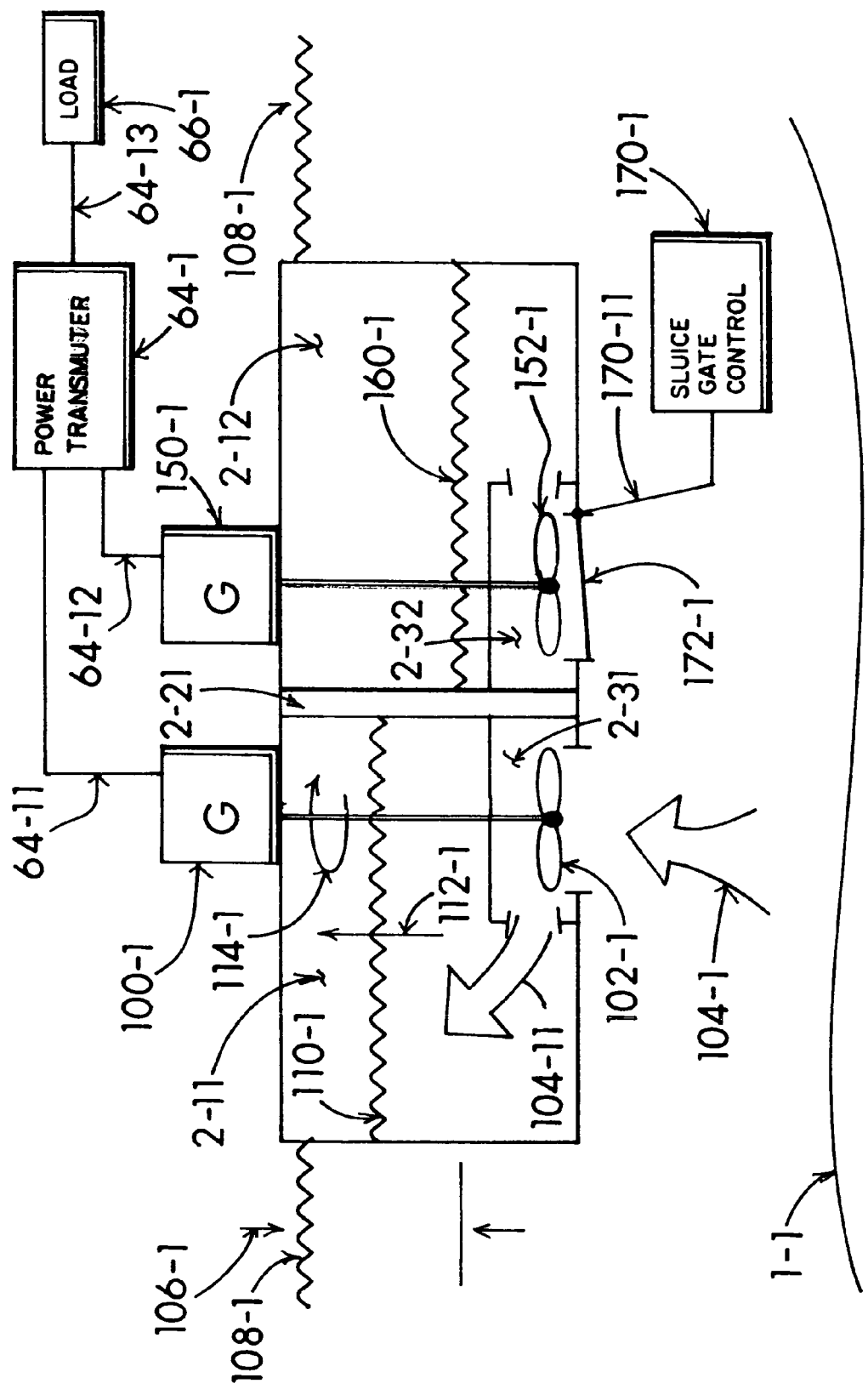
FIGS. 9-16—A sequence of operative schematics for my invention including a primary and secondary tidal basin configured to drive generators and deliver electric power.

An arrangement for my invention comprising two tidal basins 2-11,2-12 shows in FIG. 9 to include a source of oceanic tide 1-1 having risen 106-1 to a high-tide level 108-1. The result is an inrush 104-1 of tide-pressured water through a turbine 102-1 and into 104-11 a primary basin causing a rise 112-1 in the basin's water level 110-1 depicted BA in reference to FIG. 17. The turbine 102-1 is driven by this hydrodynamic action to convert into a mechanical rotation 114-1 of a shaft-member for driving a generator 100-1 delivering electric power 64-11 to a power transmuter 64-1. The transmuter adapts the generator output 64-13 into an usually constant-frequency alternating current power deliverable to a utile load 66-1. Observe that FIG. 9 also shows a secondary tidal basin 2-12 separated 2-21 from the primary tidal basin 2-11 and having an inlet presently protected against tidal water influx by a closed regulator gate 172-1 commanded closed 170-11 during the present interval by a sluice gate controller 170-1. As a result, the water level 160-1 is maintained near a low-tide level and the turbine 152-1 and generator 150-1 are quiet thereby delivering 64-12 no power to the transmuter 64-1.

Figure 10:
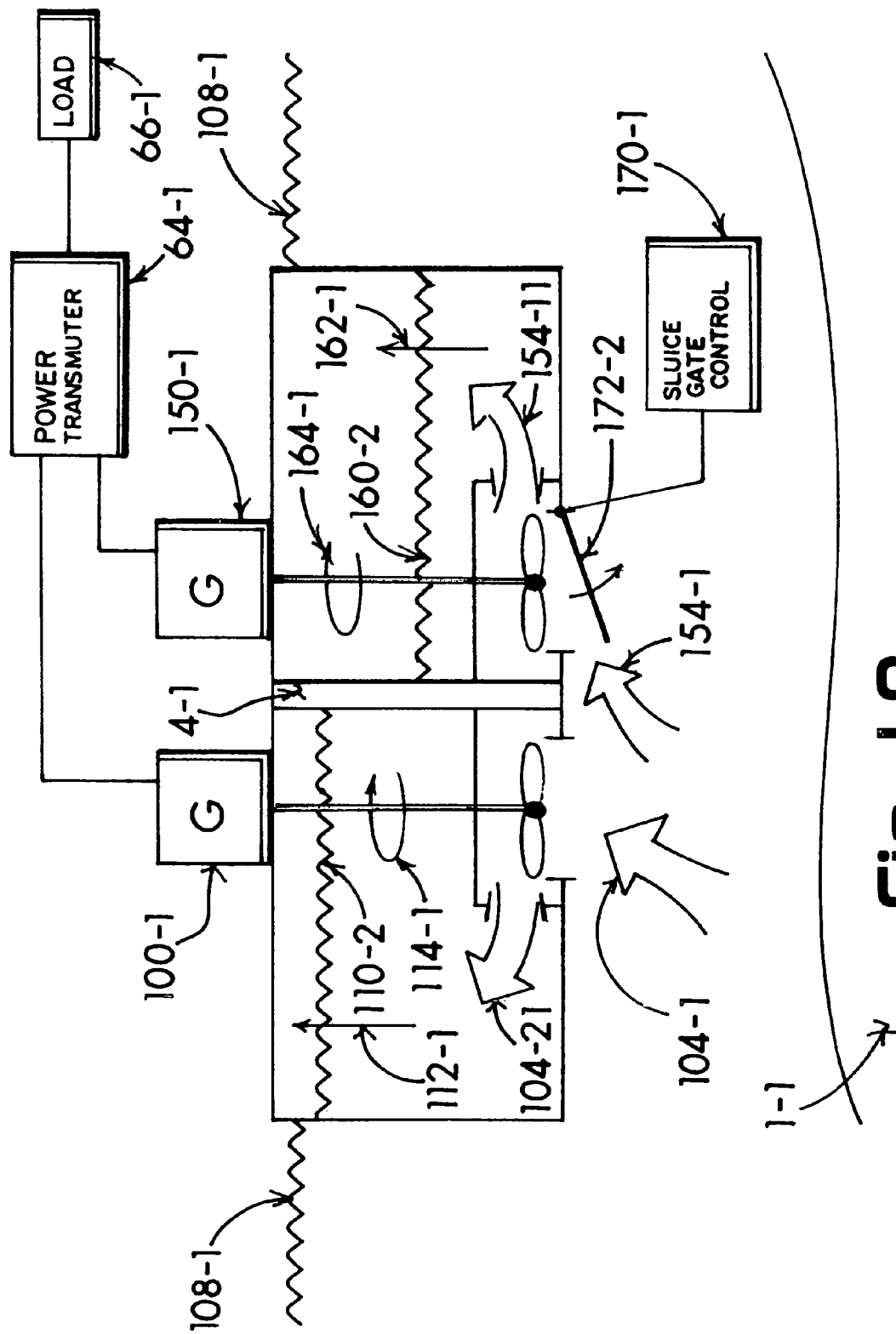
Figure 11:
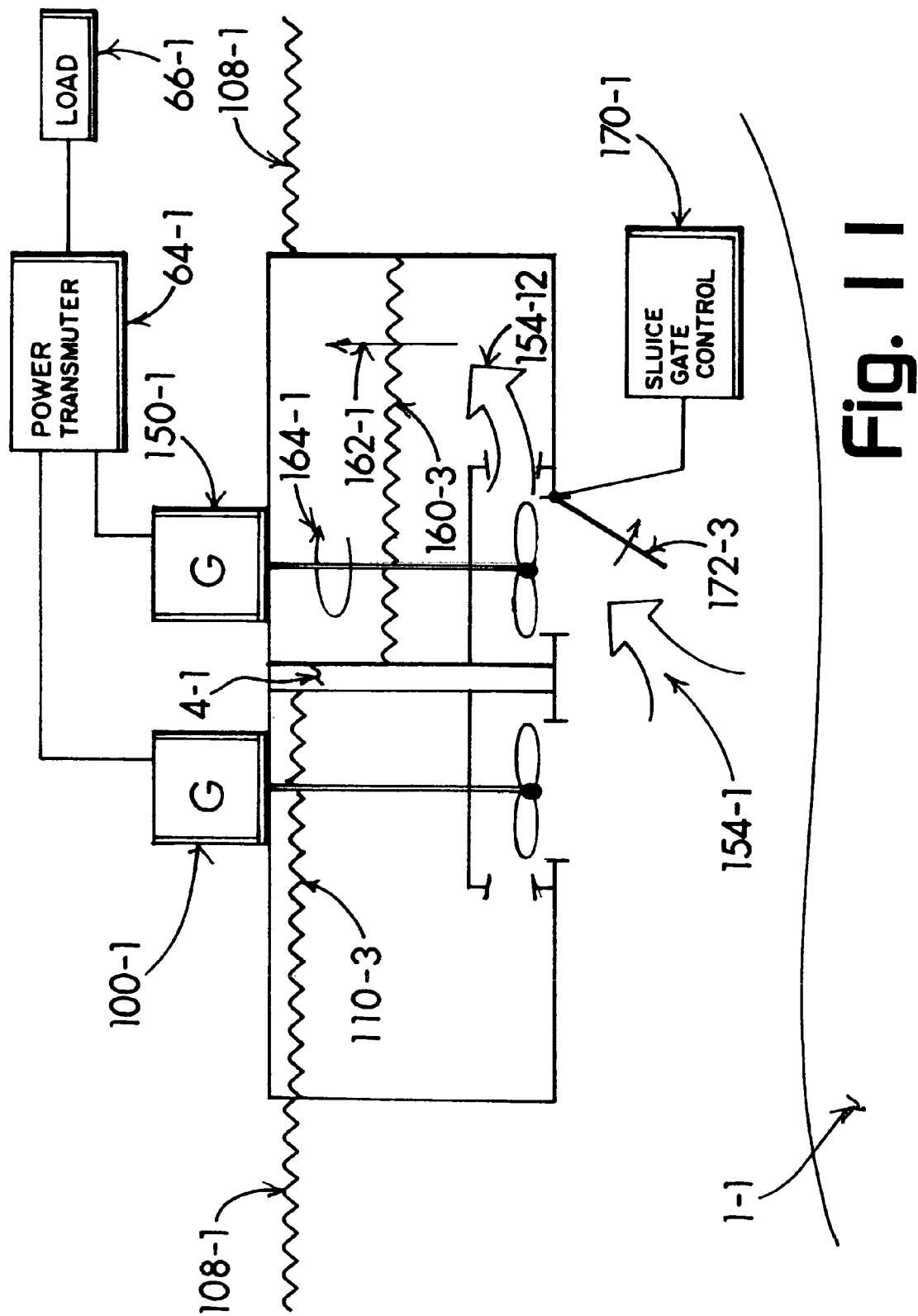

When the primary tidal basin's water level 110-2 nears the high tide level 108-1 BAA-BAB, the turbine excitation weakens due to a lessened inflowing of water 104-1,104-21. In a natural tidal setting, the fall-off of tidal forces operating on the turbine decay in a predictable more or less sinusoidal manner which according to FIG. 10 is in turn compensated for by a graduated opening of the secondary tidal basin's regulator gate 172-2 to allow an increasing inflow 154-1,154-11 of water through the secondary turbine 152-1 for delivering rotational force 164-1 to the secondary generator 150-1 as coupled with the transmuter 64-1. The secondary tidal basin water level 160-2 rises 162-1 in FIG. 17 as BBA-BBB towards the high tide level 108-1 as depicted in FIG. 11 to include a full-opening of the secondary regulator gate 172-3 when the primary basin water level 110-3 is most near the high tide level 108-1. Thus a maximum of energy is delivered to the secondary generator 150-1 by the turbine 152-1 while the primary generator 100-1 is. It is the teaching intent of the invention that this occurs during the high slack tide level period of the usual diurnal tide-cycle.

Figure 12:
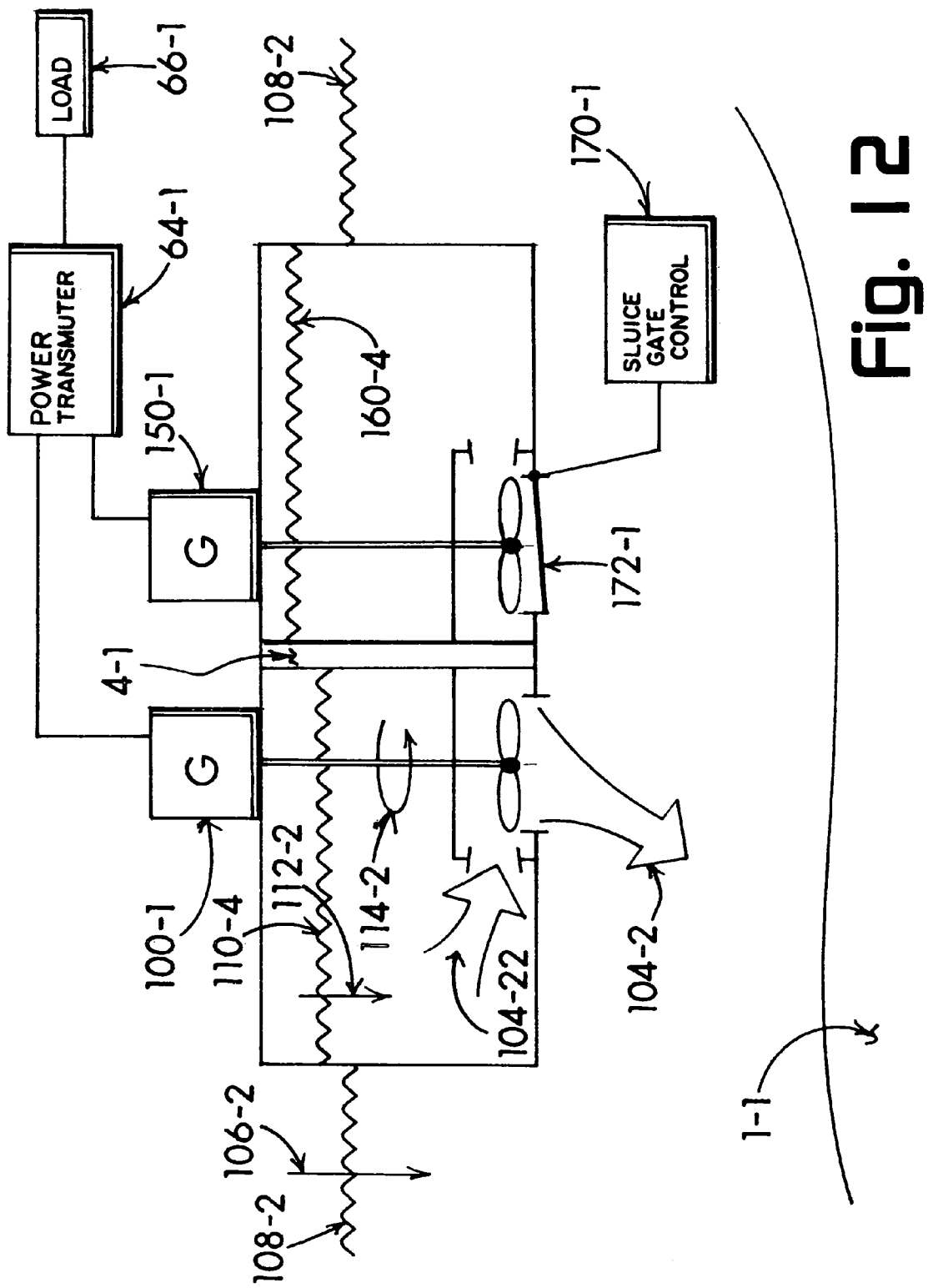
Figure 13:
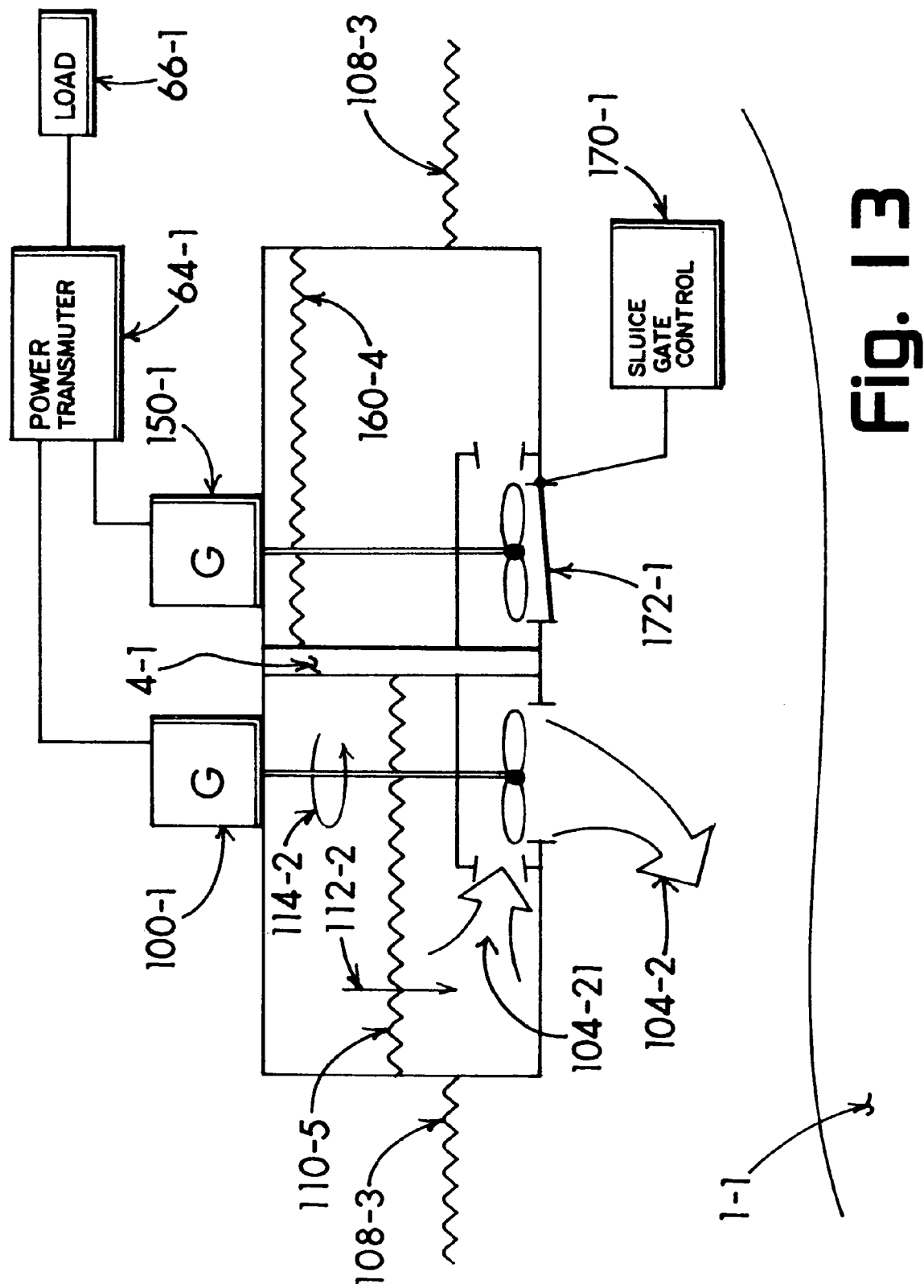
Figure 14:
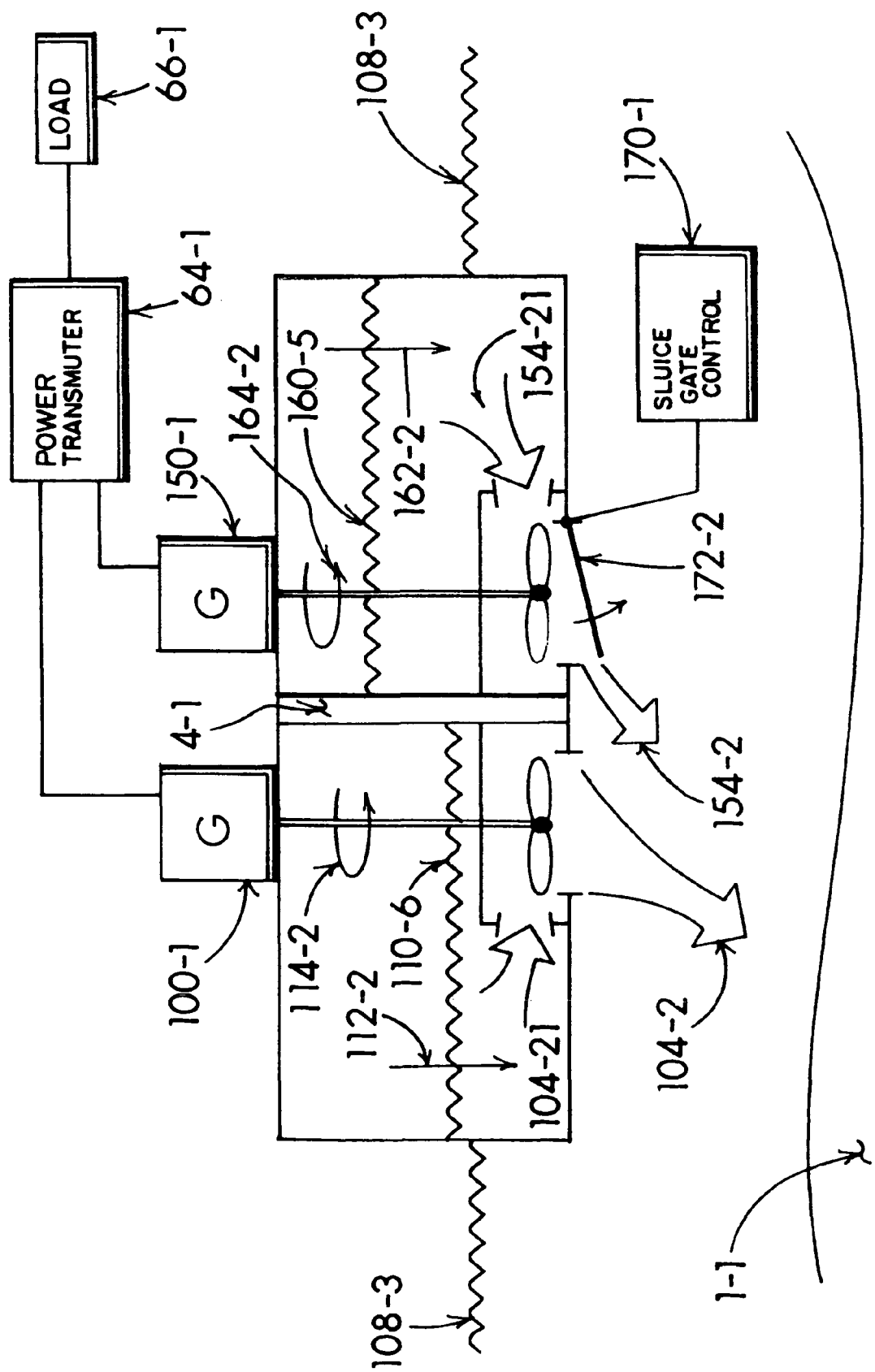

As the diurnal tide-cycle advances, a falling 106-2 ebb tide 108-2 period BAB-BAC ensues whereupon the secondary regulator gate 172-1 may once again be controllably closed as shown in FIG. 12. The tidal ebb urges the water level retained in the primary tidal basin to rush through 104-2,104-22 the primary turbine 102-1 to energize and counter-rotate 114-2 the generator 100-1 shaft member thereby delivering electric power to the transmuter 64-1. Meanwhile, the secondary regulator gate 172-1 having been appropriately closed serves to store the water level 160-4 in the secondary basin at a relatively high level BBB-BBC. The tide level continues to ebb until it reaches a near-low ebb level 108-3 whereupon the low-tide slack period occurs. As FIG. 13 shows, the outflow of water held in the primary tide basin continues to outflow 104-21 and the primary turbine 102-1 continues to counter-rotate 114-2 albeit gradually weakening in force as the primary basin level 110-6 nears the ebb tide level 108-3. As this occurs, the sluice gate control 170-1 graduates the opening of the secondary regulator gate 172-2 allowing BBC-BBD an out-rush of water 154-2, 154-21 past the secondary turbine 152-1 causing it to excite counter-rotation 164-2 of the secondary generator 150-1 shaft member. As a result, an increasing level of electric power is delivered to the transmuter by the secondary generator 150-1 as the electric power output from the primary generator decreases.

Figure 15:
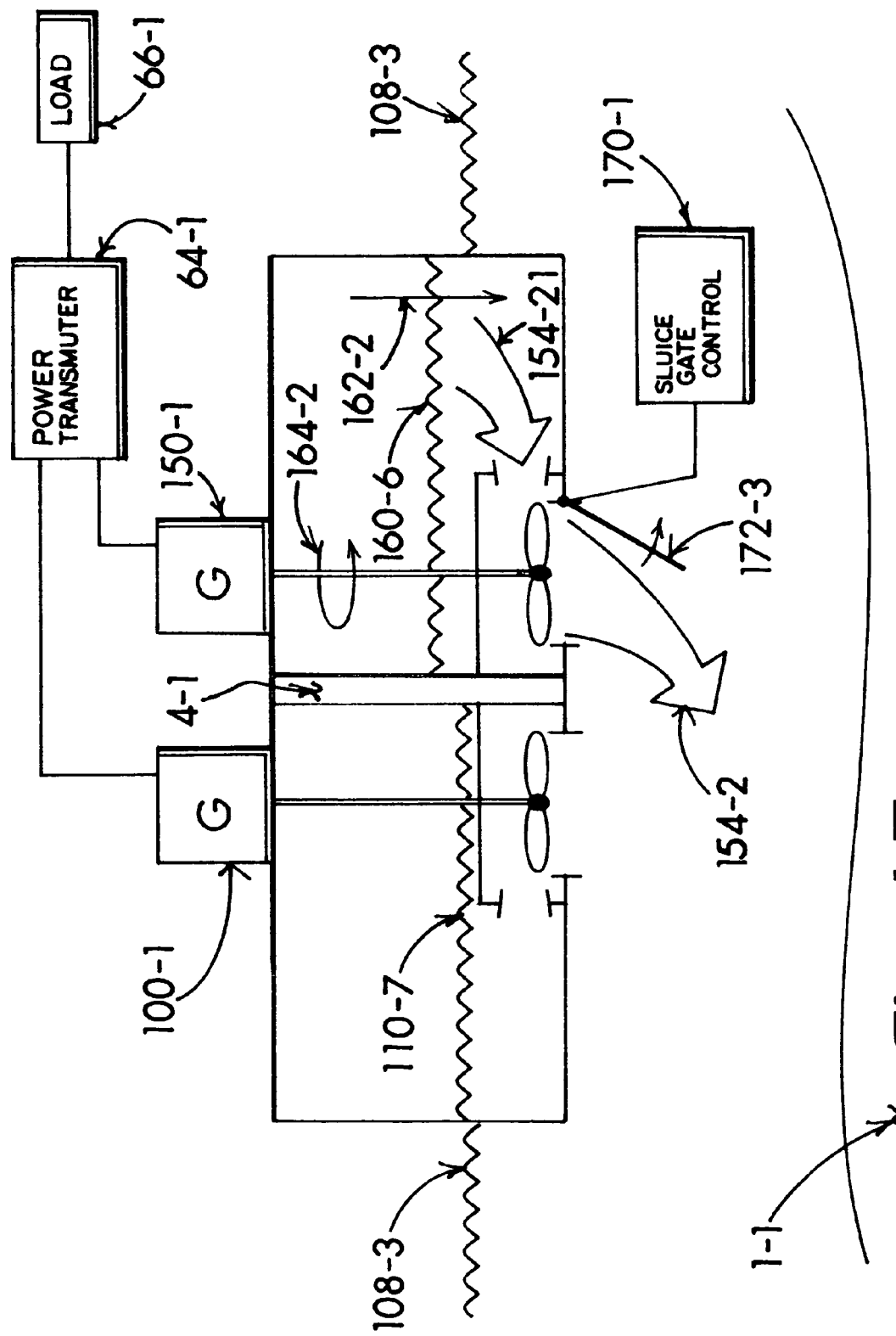
Figure 16:
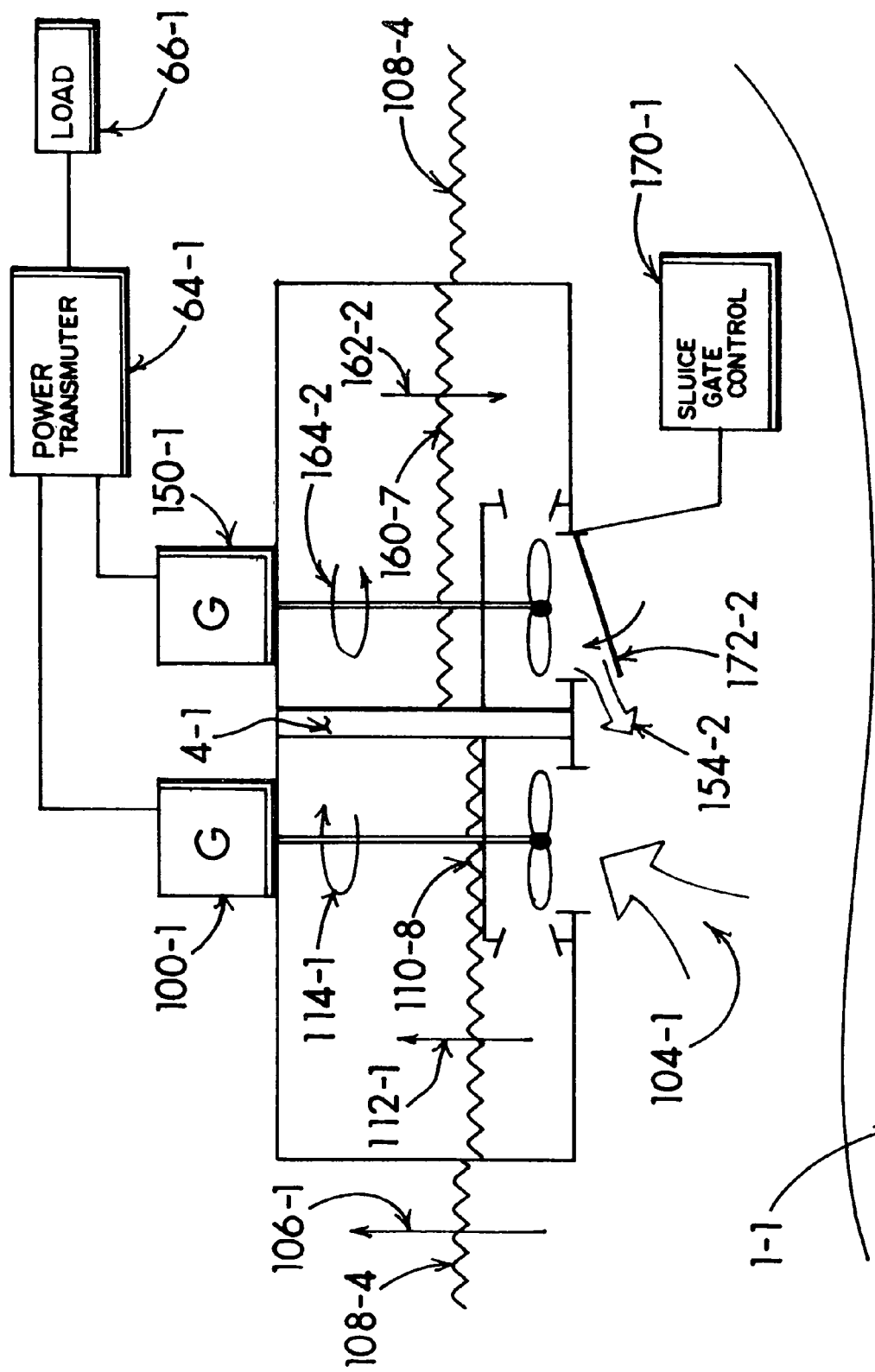

As the diurnal cycle advances towards the showing of FIG. 15, the water level 110-7 in the primary basin BAC-BAD nears that of the low slack tide level 108-3 and the turbine 102-1 quiets with the generator 100-1 output going to nil. By gauging the outflow 15421 from the secondary basin excitation of the turbine 152-1 may be maintained until the tide once again rises 106-1 as FIG. 16 portrays. The ever-increasing tide level 108-4 brings forth an excitation of the primary turbine 102-1 by the inrush 104-1 of water to once again fill the primary tide basin and urge rotation 114-1 of the generator 100-1 driven shaft member. The sluice gate control 170-1 graduates the closure of the secondary regulator gate 172-2 as the primary flow 104-1 increases. This serves to retain the water level 160-7 of the secondary basin BBD-BBE near a low level, reserving the unfilled volume as a reserve of potential energy capacity usable during the next high slack tide interval.

Figure 17:
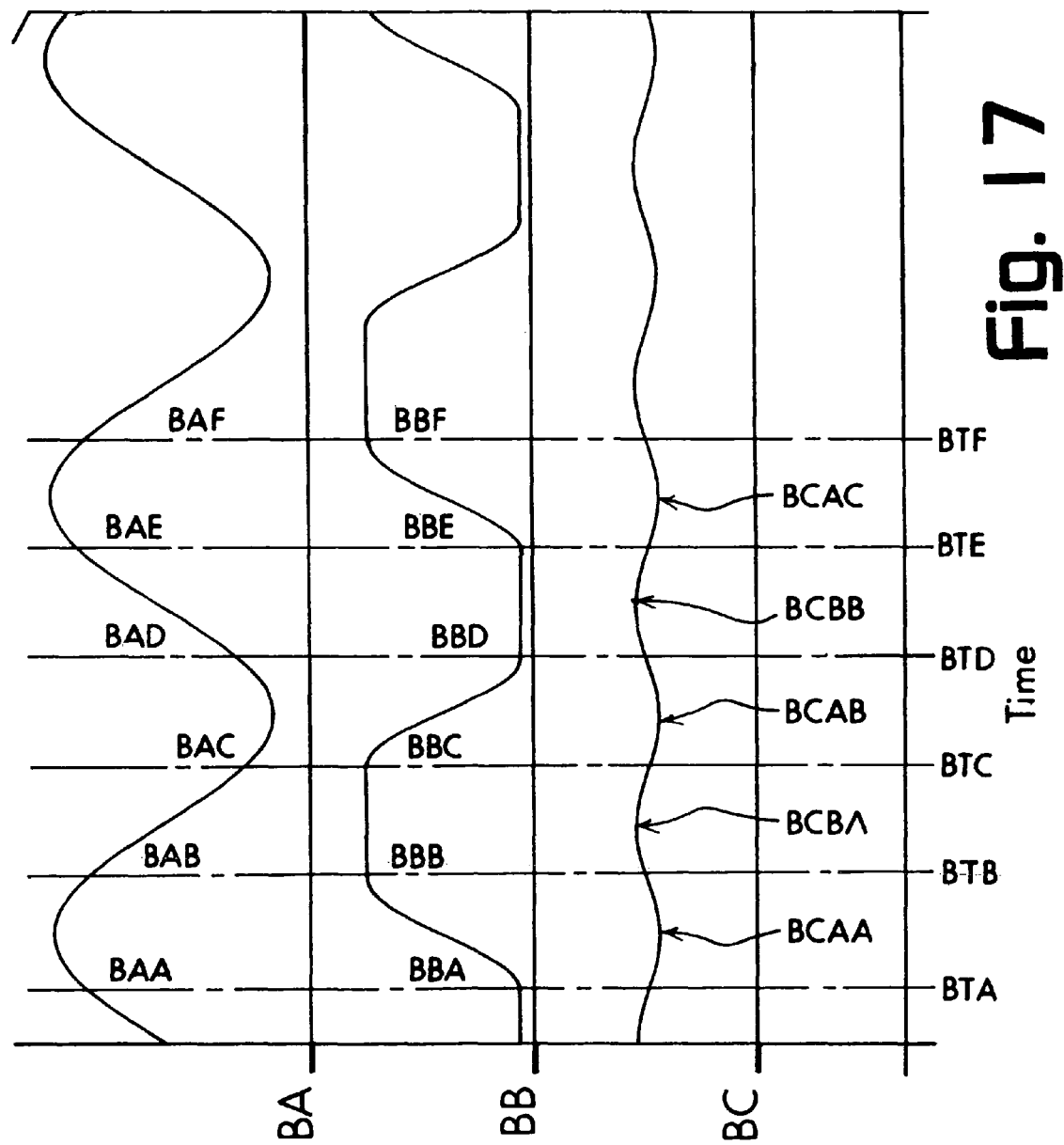
FIGS. 17-18—Waveforms attendant with the presentations of FIGS. 9-16.

By virtue of the graduated modulation of the inflow and outflow current through the secondary turbine 152-1 and its complement to the cyclic delivery of power by the primary turbine 102-1, the overall power delivery through the transmuter 64-1 remains relatively steady as shown in FIG. 17 plot BC. During periods of slack tide BAA-BBB and BAC-BAD for example, the output may moderately dip BCAA,BCAB while as the tide wanes and waxes BAB-BAC and BAD-BAE the increased flow through the primary turbine 102-1 may rise BCBA, BCBB. With considered engineering of the primary tidal basin and secondary tidal basin parameters of capacity and tide channel capacities the variation may be maintained in the +/−10% range throughout the diurnal cycle period.

Figure 18:
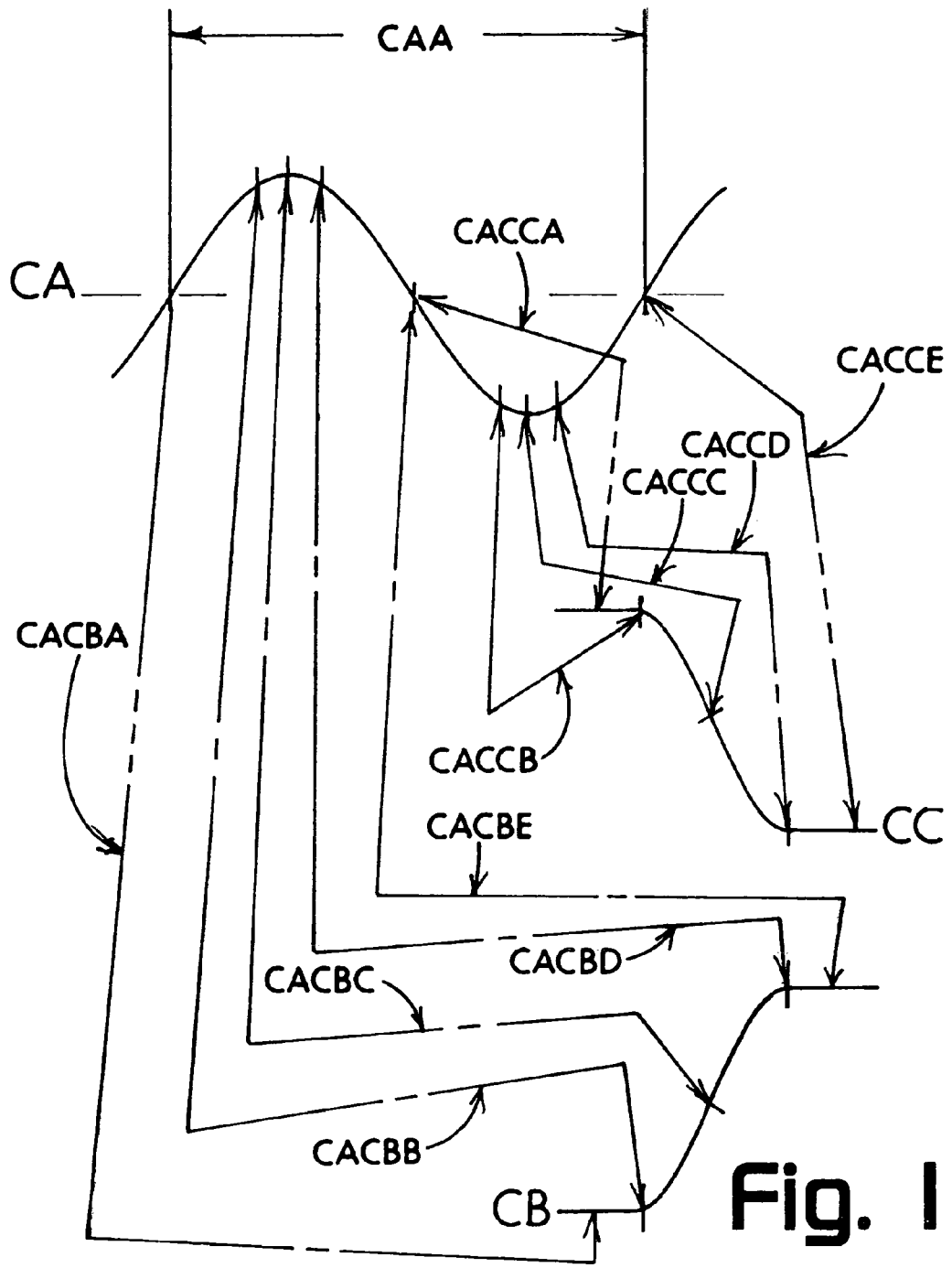

FIG. 18 particularly shows the interactional relationship between the diurnal tide-cycle CA as it acts upon the primary tide basin and the invention's modulated inflow CB and outflow CC of the secondary tide basin 2-12. Plot CA begins at mid-flow of the tide-cycle CAA when tide influx is maximal CACBA and the regulator gate 172-1 is closed, as shown on plot CB. As the tide CA rises towards crest, at about an 70-80% level the graduated opening of the regulator gate 172-1 initiates CACBB with an inflowing of water into the secondary tide basin and the resultant excitation of the turbine 152-1. As the high tide slack period elapses between intervals CACBB and CACBD the secondary tide basin is allowed to continue, albeit modulated by the sluice gate controller 170-1. Obviously in accord with plot CB, the inflow gradually increases, rises to a maximum level CACBC and then gradually decreases CACBD when the ebbing of the primal tide energy CA strengthens. As a result, the regulator gate 172-1 is again closed during the interval CACBD-CACCD which maintains the secondary tidal basin stored-up energy potential at a maximum. When the primary tidal basin outflow approaches the low-tide slack period CACCB-CACCD, the regulator gate 172-1 is graduated open by the sluice regulator gate controller 170-1 to allow a discharge of the held-back water energy in the secondary tidal basin 2-12 through the secondary turbine 152-1. When the low-tide slack mid-point CACCC is reached, the outflowing from the secondary tidal basin is ordinarily about maximum as commanded by the sluice regulator gate controller 170-1. When the diurnal cycle begins to repeat, the up-rising of the tide finds a point CACCD where the regulator gate 172-1 may again be programmatically closed, thereby maintaining the low water level in the secondary tidal basin as a reserve source of tidal energy during the next high-tide slack period.

Presentment II

Figure 19:
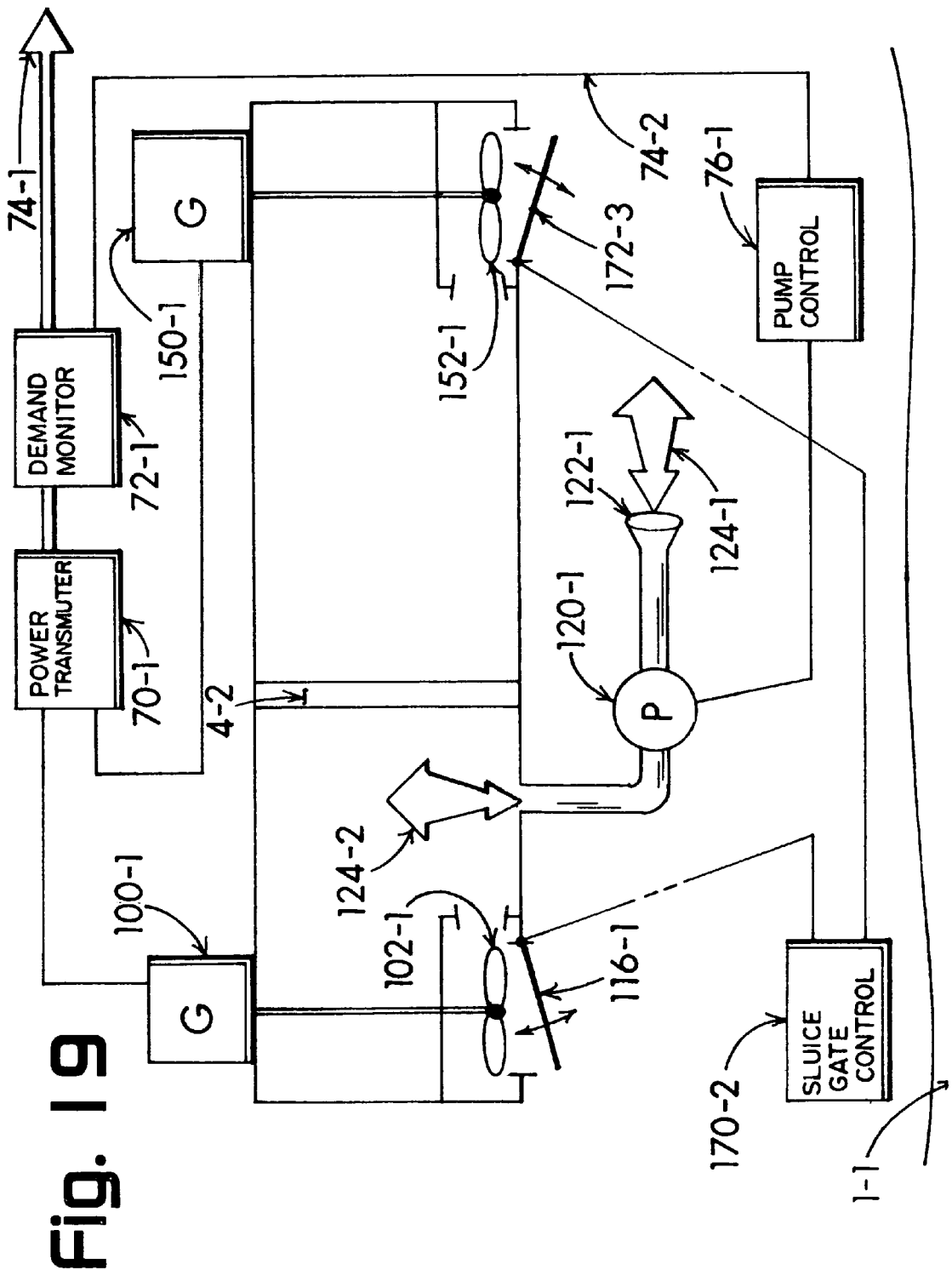
FIG. 19—Introduction of an ancillary pump to boost cyclic performance.

One of the factors which confound known tidal energy sources is the lack of time synchronization between tide energy availability and customer usage demand. This occurs in part because of the difference between the duration of a solar day and a diurnal (tide) day. As a result, demand may regularly peak when the tidal energy based system is least able to provide. I intend with FIG. 19 to depict how excess energy during intervals of lessened demand may be effectively stored-up to effectively meet future anticipated demands. I achieve this by introducing a pump 120-1 having an inlet/outlet 122-1 capable of bidirectional water management that may either draw water into or exhaust water from 124-2 primary tidal basin 2-11, including the primary turbine 102-1 now controlled by a regulator gate 116-1 commanded by a sluice gate controller 170-2 that determines the power needs of a directed load 74-1. During the interval of rising tide, the turbine 102-1 is utilized to service the load 74-1. During the period of high slack tide, the turbine 152-1 may service the load and preferably during the high slack tide period most of the energy potential of the secondary tidal basin is spent. To accomplish this in event of a low demand or off-peak period of demand, the pump 120-1 is operated by a pump controller 76-1 coupled 74-2 with the demand monitor 72-1 to push the level in the primary tidal basin "above normal". Then this extra energy becomes available when an increased demand occurs during the next ebb tide interval.

Conversely, when the energy available from the secondary tidal basin resources exceed demand during a period of low slack tide, the pump 120-1 may be utilize some of the excess energy to draw the primary tidal basin level down, below a level which it attains by tidal gravitational forces alone. This allows the increase of energy capability for the primary tidal basin during a subsequent period of increased demand.

Presentment III

Figure 20:
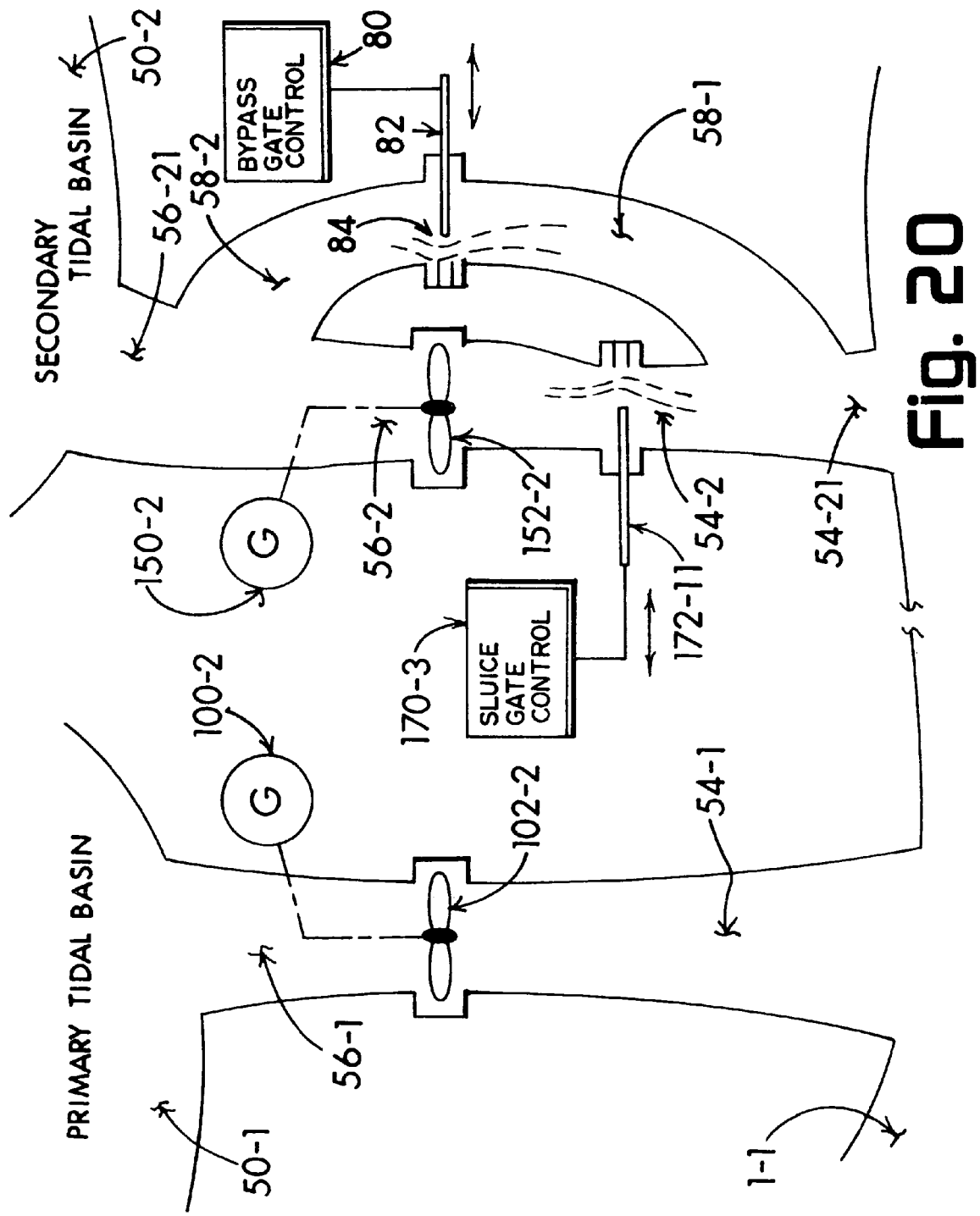
FIG. 20—Overview of the tidal facility of FIG. 8 to include supplemental bypass of the secondary tidal basin to accommodate wider swings in energy demand.

A further consideration of less-than-expected load demand may be a back-up of unused tide water inflow or outflow, particularly from the secondary tidal basin. FIG. 20 shows a situation including the elements of earlier FIG. 8 to have the secondary tidal basin 50-2 fitted with a primary tideway 54-2, 56-2 including a turbine 152-2 and a regulator gate 172-11 and controller 170-3 depicted to operate as previously taught relative with FIGS. 9-18. This showing differs through the inclusion of a bypass tideway 58-1,58-2 including a bypass control regulator gate 82 that regulates the flow 84 through the bypass tideway commanded by a bypass gate controller 80. The intent is to show that during periods of decreased load demand and while the secondary tidal basin outflows through the turbine 152-2, the near-full discharge of the reserve energy capacity of the secondary tidal basin may be accomplished by enabling a portion of the outflow to bypass the turbine through the bypass tideway 58-1,58-2. Conversely, when tidal influx occurs from a high slack tide level 1-1 into the potential containment capacity of the lowered-level secondary tidal basin 50-2, additional water may be allowed through the bypass tideway to achieve a high as possible water level resulting in a maximum of reserve energy capacity during the next period of slack low tide energy demand.

Presentment IV

Figure 21:
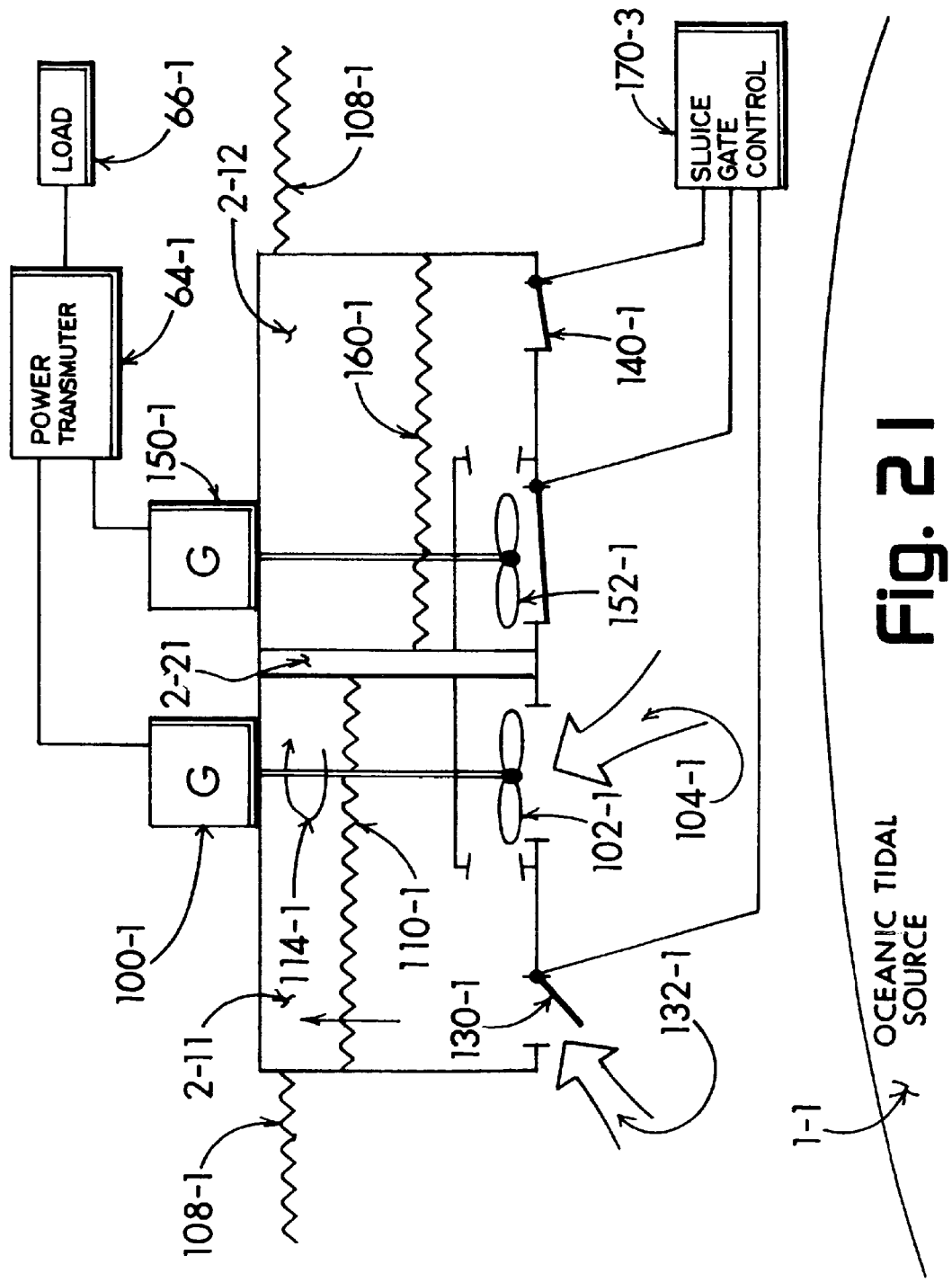
FIGS. 21-22—Operative schematics related with FIGS. 9-16 to include provision for supplemental bypass of the turbines.

My teaching of FIG. 21 particularly shows the control of the primary tidal basin 2-11 capacity. This depiction most closely associates with earlier FIG. 9 teachings with the main exception being an inclusion of an additional regulator gates 130-1 and 140-1 that may operate in concert with regulator gate 172-1 to modulate the overall performance of the tidal energy system to best match-up with load demand variations. The performance as shown includes an increasing primary tidal basin level 110-1 driving the primary turbine 102-1. In even the level 110-1 fails to increase "fast enough" due to decreased load 66-1 demand, additional inflow 132-1 is shunted into the primary tidal basin by a graduated opening of a primary bypass regulator gate 130-1 commanded by a sluice gate control 170-3. I find that the generalized decision regarding the regulator gate 130-2 operation may be determined by factoring load demand and immediate primary basin water levels relative with a measure of elapsing diurnal time concurrent with the period of high-tide slack water.

Figure 22:
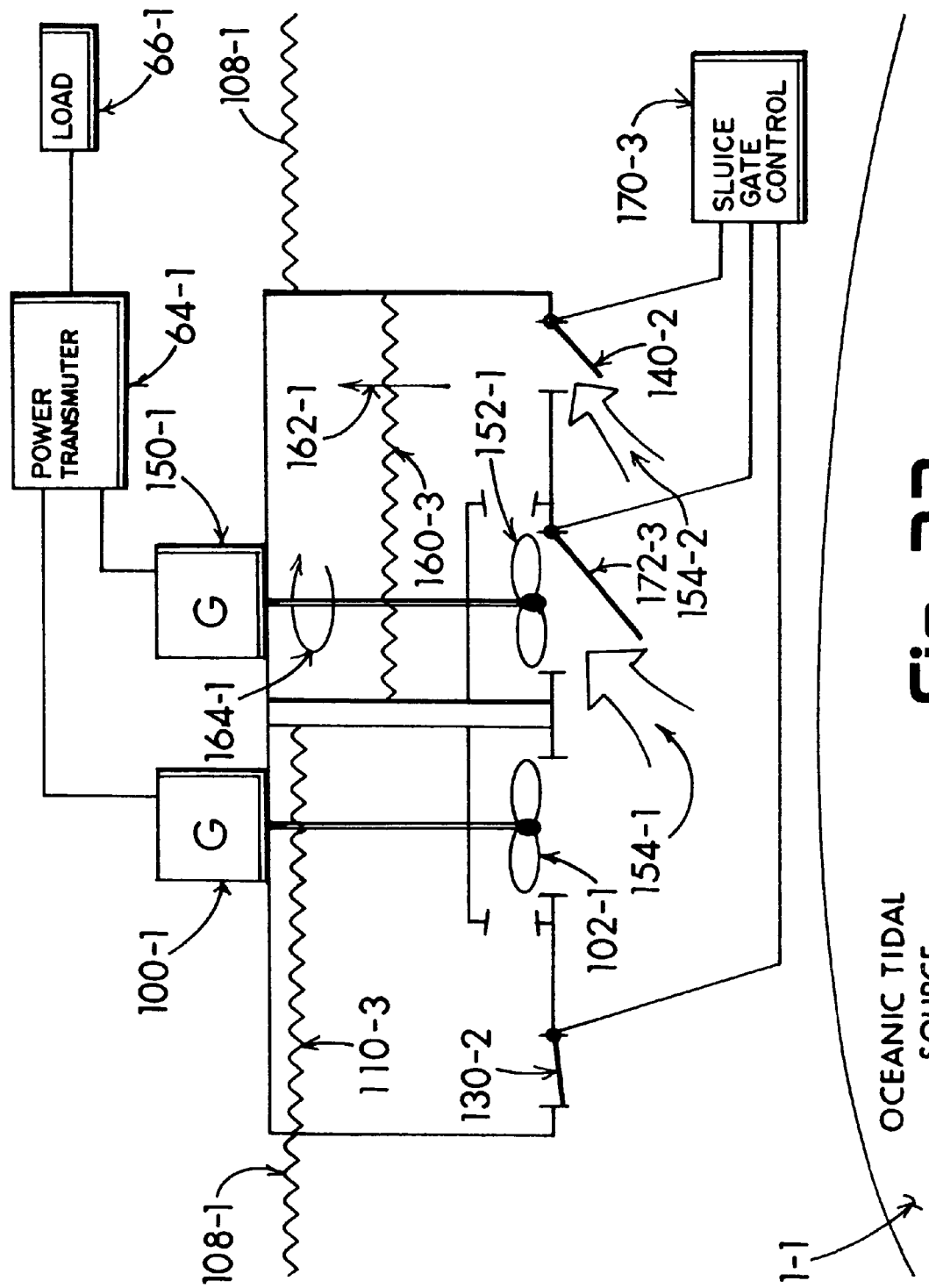

My further teaching of FIG. 22 shows the control of the secondary tidal basin 2-21 capacity. This depiction most closely associates with earlier FIG. 11 teachings with the main exception being an inclusion of the additional regulator gate 140-2, operative in concert with the sluice regulator gate 172-3 to best match-up the reserve capacity of the secondary tidal basin with immediate and anticipated load 66-1 demands. As shown, the secondary tidal basin inflow current drives the secondary turbine 152-1 and raises 162-1 the water level 160-3. In event the water level increase is lagging, relative with the duration of the attendant high-tide slack period that might be wrought by the decreased load 66-1 demand, an additional inflow 154-2 of water is shunted into the secondary tidal basin by the graduated opening of a secondary bypass regulator gate 140-2 commanded by the sluice gate control 170-3. Once again, I find that the generalized decision regarding the regulator gate 140-2 operation is best determined by factoring load demand and immediate secondary tidal basin water level relative with a measure of elapsing diurnal time concurrent with the period of low-tide slack water.

Presentment V

I find a further enhancement in performance utilizing more than one supplemental tidal basin in addition to the primary tidal basin. I schematically depict this embodiment in FIG. 23 to include the primary tidal basin 2-11, the secondary tidal basin 2-121 and an additional tertiary tidal basin 2-122. The secondary and tertiary tidal basins are both fit with regulator gated turbines 152-31,152-32 coupled with generators 150-11,150-12 to deliver power to a power transmuter 64-2 coupled with the load 66-1. Each of the turbines 152-31,152-32 include a regulator gate provision 180-2,182-1 commanded by a sluice gate controller 170-2.

Figure 23:
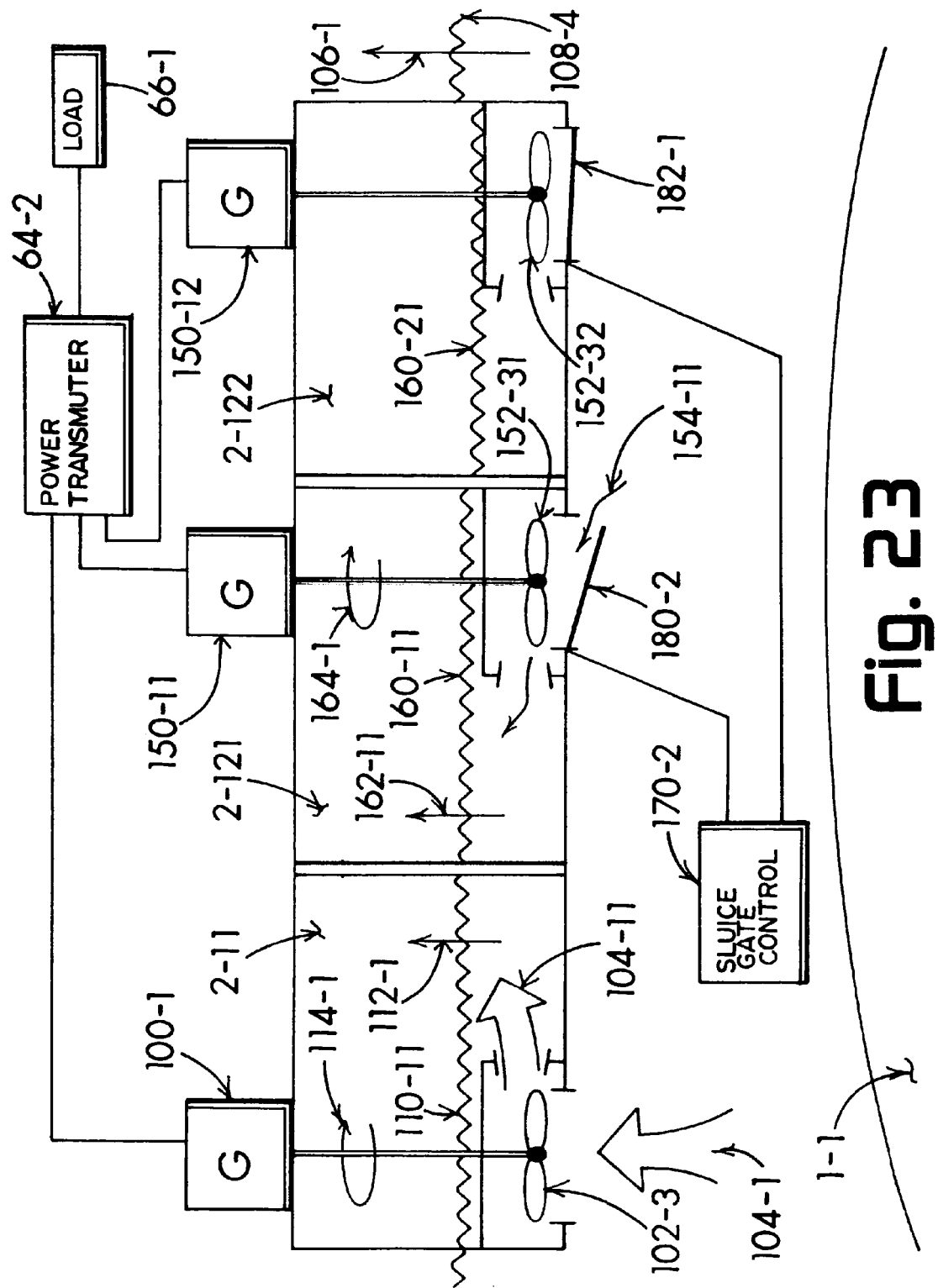
FIGS. 23-29—A sequence of depictions showing a primary, secondary and tertiary tidal basins intending to support a more uniform delivery of electric energy to the load.
Figure 24:
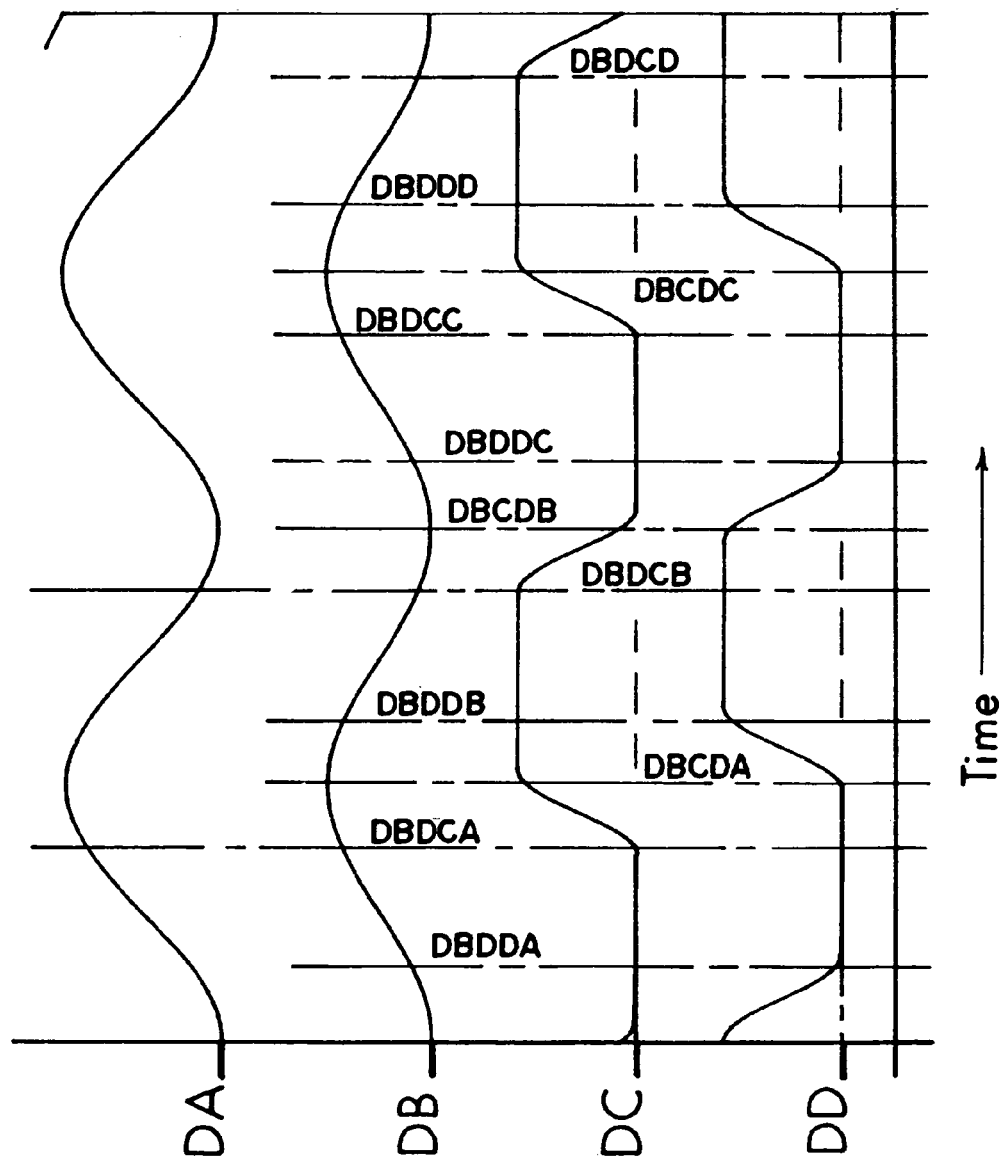

As FIG. 23 shows, the low tide 108-4 is rising 106-1 with the oceanic source 1-1 tidewater DA of FIG. 24 rushing in 104-1 to drive a primary turbine 102-3 by turning 114-1 the generator 100-1 main-shaft. The inflowing water 104-11 increases 112-1 the water level DB in the primary tidal basin near the same rate as the tide DAAA is rising 106-1. As this occurs, the secondary regulator gate 180-2 is being closed and the inflow 154-11 diminished, thereby maintaining the secondary tidal basin level 160-11 near minimum DCAA,DCAB and with the turbine 152-31 rotational excitation 164-1 of the generator 150-11 about to cease. It is the intent of allowing this minor inflow into the secondary tidal basin to maintain some additional power delivery from the secondary generator 150-11 during the early stage of the sinusoidal-like increase DBAA in tidal current inflow. The tertiary regulator gate 182-1 is purposefully closed at a low portion DDAA of a precedent diurnal cycle (near the low-tide slack time), hence to retain a maximum of reserve capacity when the secondary tidal basin nears capacity DBCDA.

Figure 25:
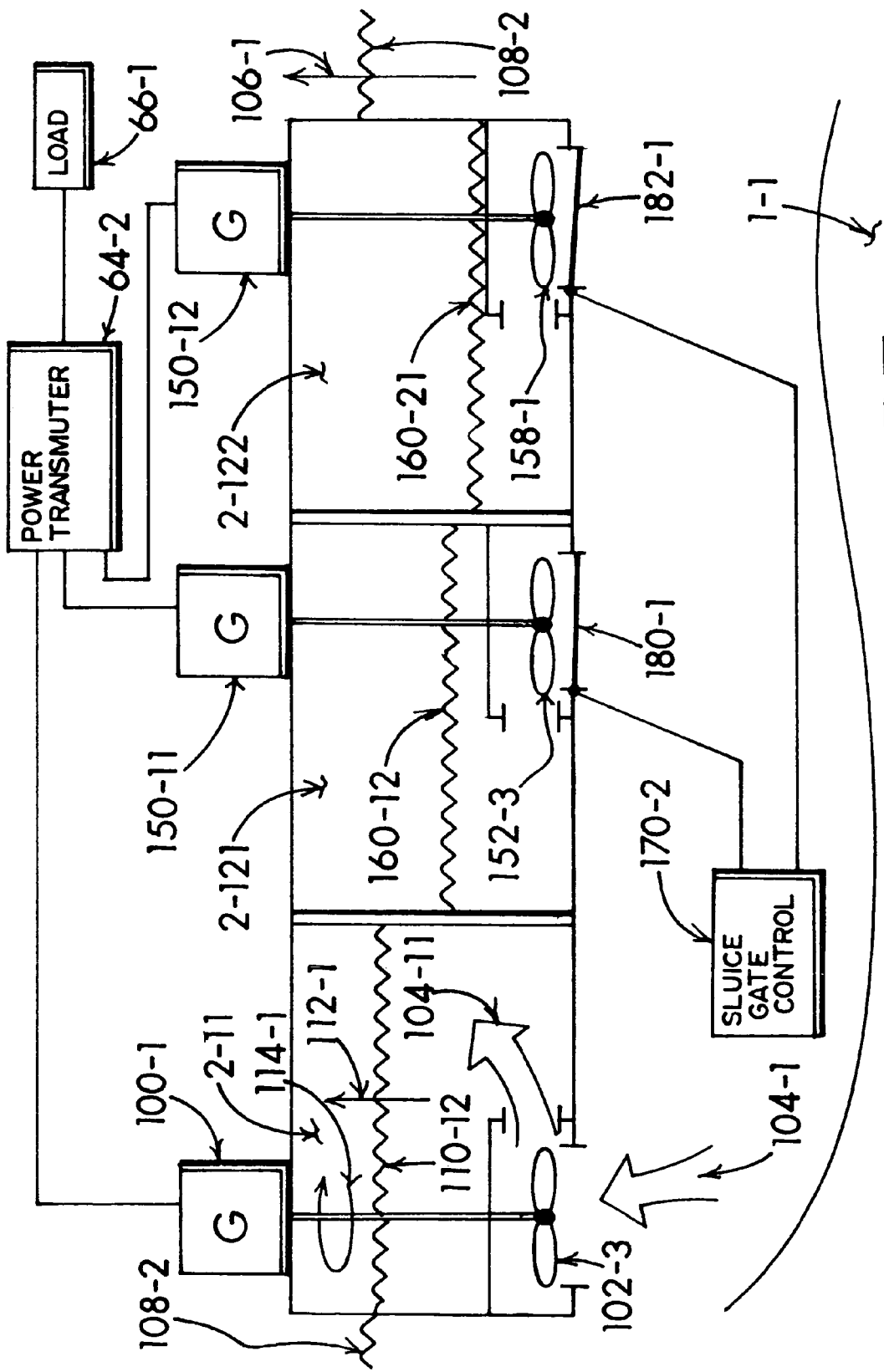
Figure 26:
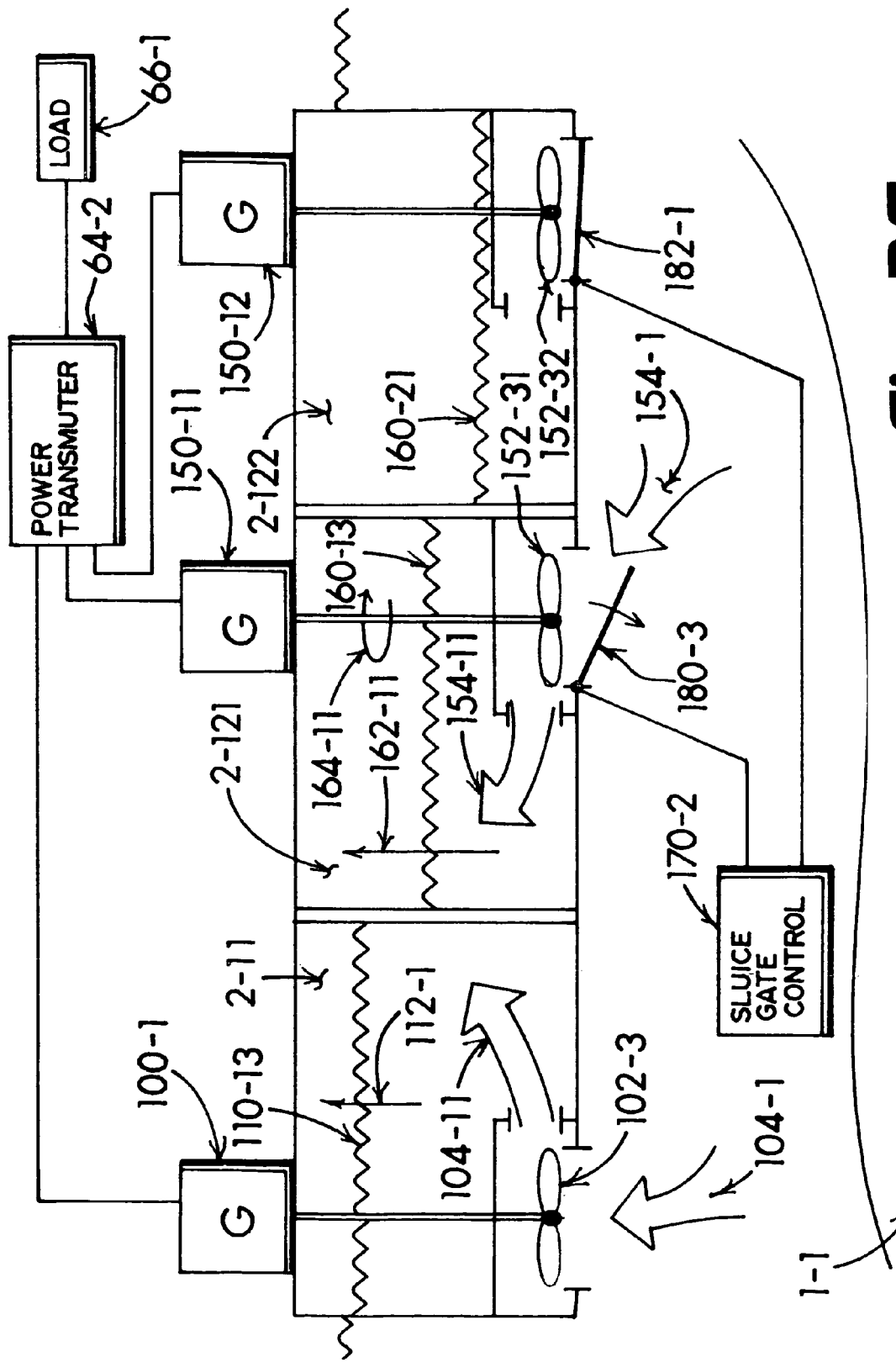

FIG. 25 shows the secondary regulator gate 180-1 fully closed and the secondary tidal basin level 160-12 slightly above a minimum tide level DCAA,DCAB by the amount of tidewater flow that entered 154-11 before the regulator gate 180-2 of FIG. 23 occurred. The tertiary regulator gate 182-1 is also closed assuring that the tertiary tidal basin level is maintained near DDAA,DDAB the minimum tide level with the empty volume 2-122 available as a potential source of tidal influx energy reserve for efficiently driving the generators when high tide slack time occurs and the secondary basin approaches the high-water level DCBA,DCBB. With the tide 108-2 rising 106-1, the forceful inflowing 104-1 of tide water DBAB urges the primary turbine 102-3 to rotate 114-1 the shaft member of the primary generator 100-1 to deliver electric energy to the power transmuter 64-2. The inflow 104-11 causes the primary tidal basin 2-11 level 110-12 to increase until reaching about 80% of the high tide level, whereupon the secondary regulator gate 180-3 is graduated open. A modulated inflowing of tidewater 154-1 urges the turbine 152-31 to produce rotation 164-11 of the generator 150-11 thereby delivering an increase of electric energy to the power transmuter 64-2 as the output from the primary generator 100-1 wanes. During this interval of operation, the water level 160-13 increases and as it approaches the oceanic tidewater level 108-2, it's output decreases. When the primary tidal basin water level 110-3 nears the tide water level 108-1 and the generator 100-1 output drops-off by a predetermined amount, the secondary regulator gate 180-3 is graduated open as shown in FIG. 26, enabling an influx of tidewater 154-1 into the available capacity 2-121 of the secondary tide basin.

Figure 27:
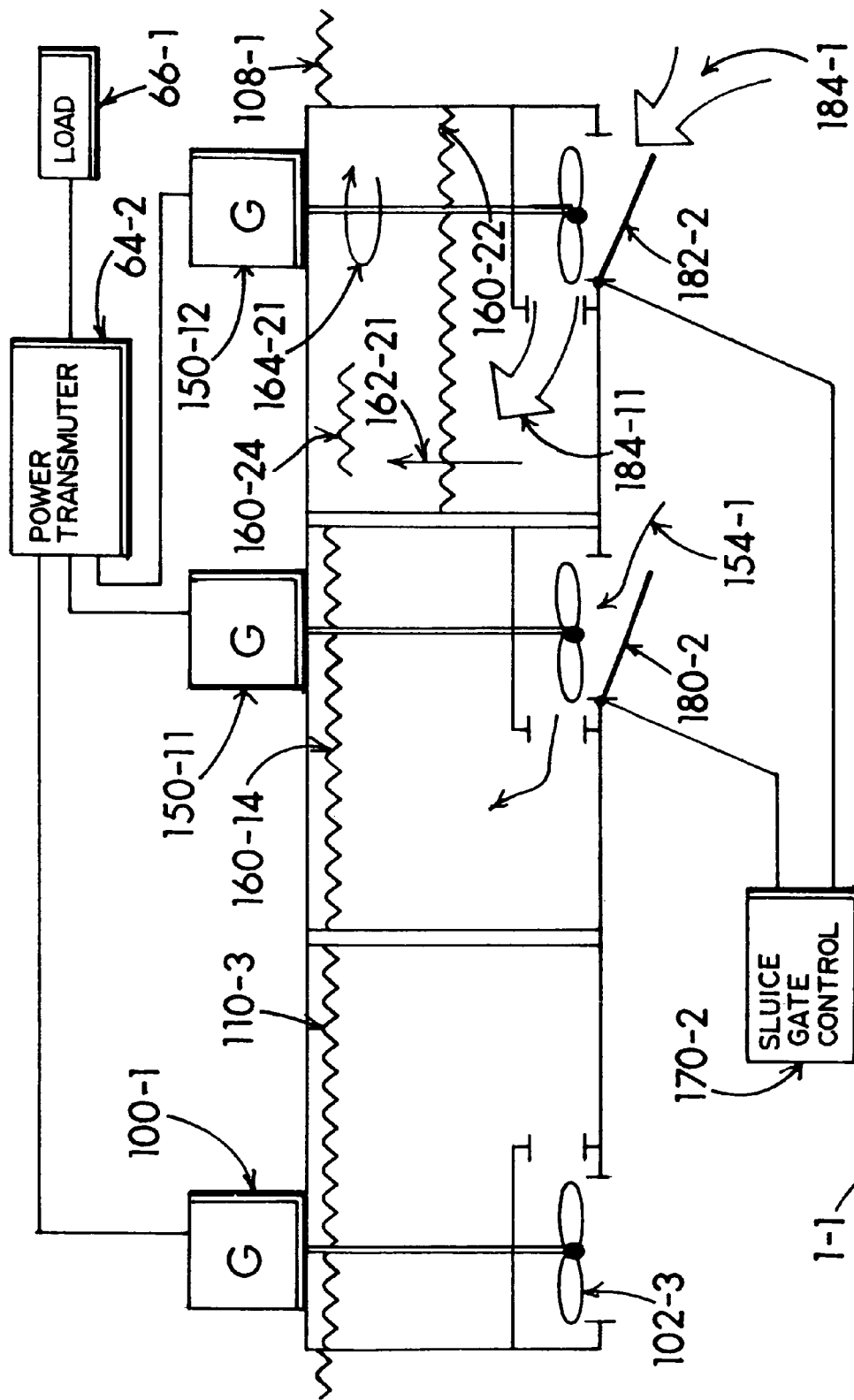

Engineering considerations assure that nearly empty DCAA,DCAB available space in the secondary tide basin 2-121 suffices as a reserve energy resource DC for at least the first half of the high-tide slack time DBDCA-DBCDA. When the turbine 154-1 performance dwindles as the secondary basin 2-121 fills to a virtual slack level DCBA, the tertiary regulator gate is graduated open in FIG. 27 by the sluice gate controller 170-2 to allow a modulated flow influx through the tertiary turbine 152-32 by utilizing the previously emptied volume DDAA,DDAB of tertiary tide basin 2-122 as the reserve energy resource DD for at least the second half DBCDA-DBDDB of the high-tide slack time.

Figure 28:
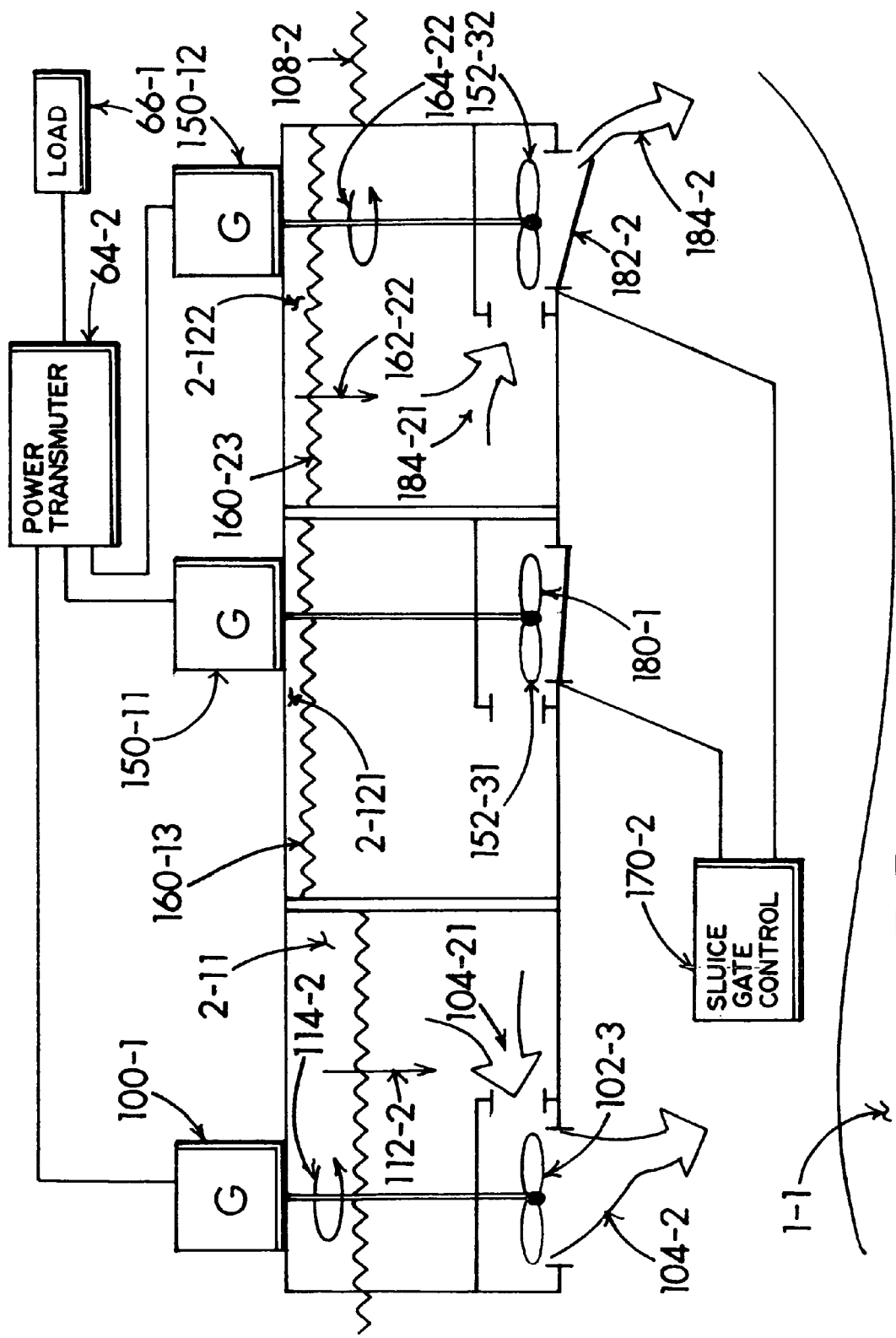
Figure 29:
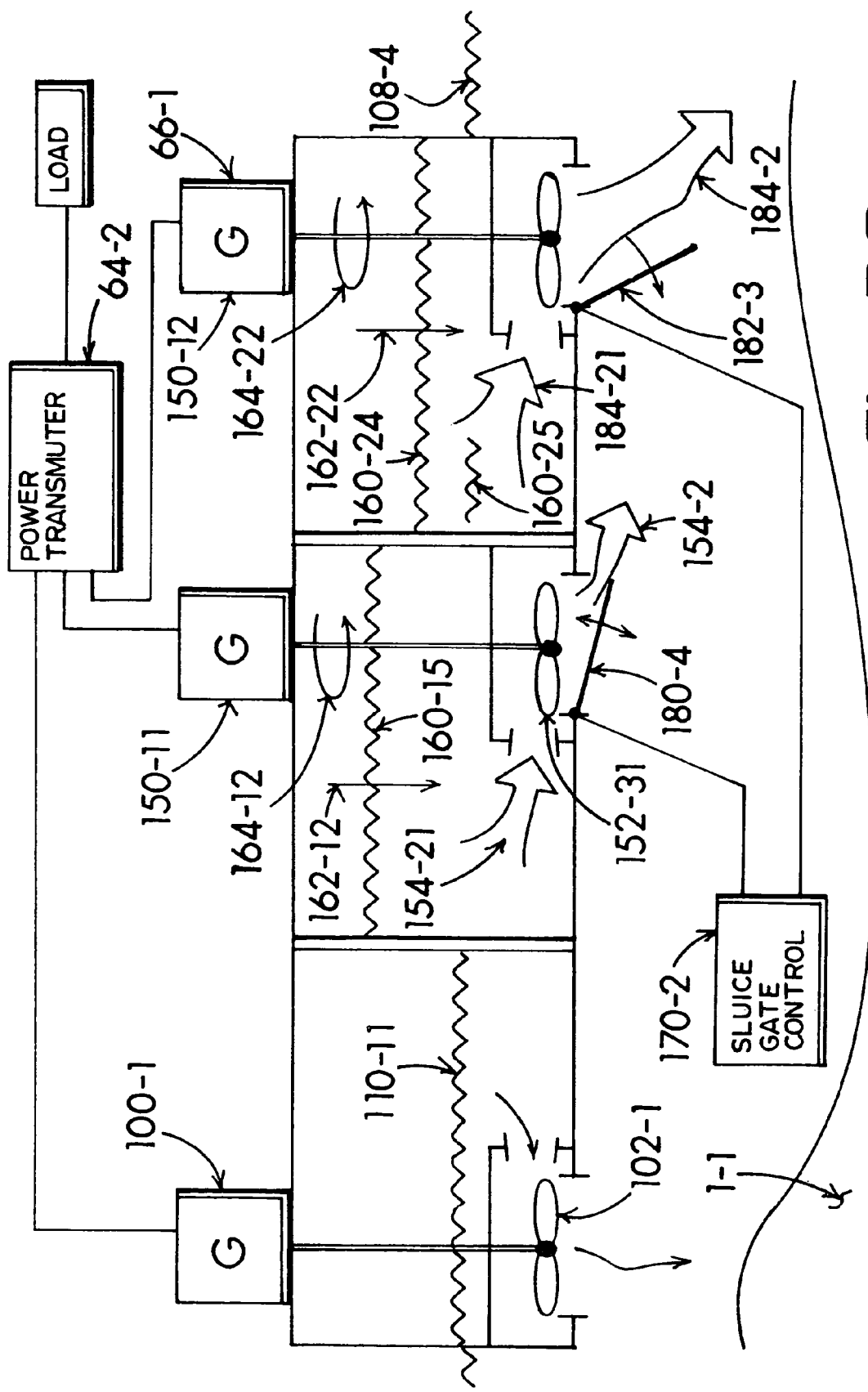

When the tide reflux occurs DBDDB-DBDCB the primary turbine 102-3 is operated by the outflow 104-2 of FIG. 28 which is the exhaust current 104-21 created as the oceanic tide 108-2 ebbs and the primary tidal basin 2-11 virtual tide level 110-13 goes down. As the ebb tide period climaxes and the slack-after-ebb time begins, the tertiary regulator gate 182-2 of FIG. 28 is graduated open by the sluice gate control 170-2 during an initial portion DBDCB-DBCDB of the slack water period to allow the secondary basin's held-back water to outflow through the turbine 182-2. The controller 170-2 regulates the regulator gate 182-2 to modulate the outflow of the tertiary tidal basin hydrodynamic reserves to an extent which balances the tapering-off of the primary turbine 102-3 performance as the water level in the primary tidal basin reaches the low-tide level.

As the tertiary tidal basin water reserves become depleted and the tertiary turbine 152-32 performance wanes, I show a graduated opening of the secondary regulator gate 180-4 which allows an outflow 154-2, 154-21 of held-back water stored in the secondary tidal basin through the secondary turbine 152-31. Ordinarily this determined to occur DBCDB-DBDDC between the decline of the tertiary tidal basin outflow 184-2 and an onset of the primary tidal basin inflow 104-1 of FIG. 3.

The combination of the secondary tidal water basin and tertiary tidal water basin is to establish a reserve of sufficient hydrodynamic energy as controllably contained tidal influx and outflow to carry-over operation of the secondary turbine and tertiary turbine while the primary turbine is down, during the slack water tidal periods which represent about 50% the overall diurnal tide-cycle. In a preferred implementation the secondary tidal basin and tertiary tidal basin each deliver a virtual tide that supports about 25% of the overall energy needs of the full diurnal tide-cycle. The result is an about 100% electric power delivery throughout the diurnal cycle.

Presentment VI

A preferred combination of three turbine and generator hookups appear in the schematic of FIG. 30. The desired result is for any combination of generator operation urged by the turbines to satisfy a formulation:

$$GA+GB+GC=PA$$

where: GA=output of primary generator 200
GB=output of secondary generator 210
GC=output of tertiary generator 220
PA=available power by user load 248

What this declares is that the primary turbine 202, secondary turbine 212 and tertiary turbine 222 may be variously excited so long as their net total delivered power equates to the load demand. This is the crux of my invention, that is to variously regulate the output of the several generators by utilizing rotation sensors 206,216,226 and processing the rotation data 230 to deliver a control signal to an excitation controller 234 for purpose of modulating the operation of each of the generators. The result is an about constant-sum level of power delivered 208,218,228 to a power transmuter 240 that processes usually d.c. power delivered by the generators' outputs into a constant (usually 60-Hz) frequency 3-phase power connectable 242 with a (commercial) power grid 244 and distributed 246 as 3-phase power to a customer user load base 248.

Practice Caveats

The gist of my invention is to provide an average level of energy delivery throughout a diurnal tidal cycle through storing water in a reserve tidal basin during periods of intense tidal current flow and subsequently releasing the stored water reserve as a virtual tide during periods of tidal slack water when insignificant natural tidal current avails itself to produce any meaningful power. By virtue of the diurnal cycle having a predictable regularity, upcoming power loading needs may be mostly anticipated and prepared for by gauging the stored water reserve in proportion to the expected demand. My invention provides accommodation of the non-synchronous natural relationship between the diurnal day cycle and the solar day cycle so as to provide relatively constant power availability no matter what the current phase relationship is between the two differing day cycles.

My invention intends to teach how the tide water energy may be presently utilized, routinely captured and subsequently reapplied to fill-in for regular gaps in conventional tidal power production. I describe tidal basins to include any sort of barrage enclosed water body, estuaries, dammed water bodies or other natural or man-made containment practiced as a civil engineering project. Turbines are to be broadly interpreted as any hydrodynamic engine capable of delivering mechanical energy derived from water current. Generators are machines for converting the turbine's mechanical energy, such as a rotating shaft, into electrical energy whether a.c. or d.c. in character. A power transmuter is any of a known variety of electrical apparatus capable of adapting the inconstant electric energy individually delivered by the generators into a constant-frequency alternating current suitable for commercial utility power utilization. My invention is most intentionally a producer of reliable and substantially constant level commercial quality electric power from the profoundly cyclic oceanic tidal wave energy source.

I realize that as the art-field unfolds, other elements, methods and interpretations may avail themselves for utilization by a practitioner. This invention must be broadly read for its essence and not narrowly dependent upon a practitioner's mere affinity for implementation preferences, embodiment choices, hindsight or similar prejudices. The scope of this invention extends to the comprehensive practice of the schematized methods and illustrative teachings I provide and presently claim as basic to my invention's novelty and practicable utility.

What I claim for my invention is:

1. A hydroelectric power generation system comprising an influx and reflux of an oceanic source of tidal energy driving a first hydrodynamic engine and a first generator apparatus by a first tidewater flow commuting through a primary tideway between the oceanic source and a primary tidal reservoir and by a secondary tidal reservoir maintained about an immediately-antecedent slack-tide water level of the oceanic source by a sluice gate held-closed during alternate flood tide and ebb tide quadrants of the first tidewater flow and a controlled release of the secondary tidal reservoir retained capacity managed by gradating an opening of the sluice gate during alternate slack-tide quadrants of diminished first tidal flow to produce a virtual tidewater flow commuting through a secondary tideway situate between the secondary tidal reservoir and the oceanic source to drive a second hydrodynamic engine and a second generator apparatus; whereby the first generator and the second generator may transmute the oceanic source's natural diurnal tide-cycle quadrants of flood tide, high slack-tide, ebb tide and low slack-tide into an invariant source of electric power.

2. The hydroelectric power generation system of claim 1 including a first determining and a summing of a first rate of tidewater flow through the primary tideway and a second rate of virtual tidewater flow through the secondary tideway; regulating a gradated closure of the sluice gate proportional to a summing increase and regulating a graduated opening of the sluice gate proportional to a summing decrease; whereby the summation of the first rate and the second rate is utilized to adjust the gradated virtual tidewater flow-rate through the sluice gate to yield a nearly constant total level of hydrodynamic energy apportioned between the first hydrodynamic engine and the second hydrodynamic engine.

3. The hydroelectric power generation system of claim 1 including a measuring of the first tidewater flow through the primary tideway; first regulating a gradated opening of the sluice gate in proportion to a measured decrease of the first tidewater flow; second regulating a gradated closing of the sluice gate in proportion to a measured increase of the first tidewater flow; commanding a full closure of the sluice gate during the period of the first tidewater flow through the primary tideway measurably exceeding a predetermined flow-rate threshold.

4. The hydroelectric power generation system of claim 1 determined to have an excess energy capacity beyond present expected load demand and utilizing an excess of the first tidewater flow energy capacity to further pump the primary tidal reservoir near a level of a next slack-tide water level and utilizing an excess of the virtual tidewater flow to further pump the primary tidal reservoir to a level of an instant slack-tide water level; whereby the excess energy capacity beyond demand is stored by the primary tidal reservoir and available as a potential energy capacity for a next quadrant of the diurnal tide-cycle.

5. The hydroelectric power generation system of claim 1 determined to have an excess energy capacity beyond a presently determined load demand and first bypassing an excess of first tidewater flow around the first hydrodynamic engine to an extent necessary to bring the primary tidal reservoir near a next slack-tide water level and second bypassing an excess of virtual tidewater flow around the second hydrodynamic engine to supplement the bringing of the primary tidal reservoir near the next slack-tide water level concurrent with reaching the next slack-tide water level; whereby the excess energy capacity is advanced to supplement the tidal energy reserve of the primary tidal reservoir available for expression during a next quadrant of oceanic tidal flux.

6. The hydroelectric power generation system of claim 5 where the excess energy capacity determination includes at least one established data source selected from presently measured demand, demand history, tide history, present tidal operating quadrant and phase, climatic conditions, day of week, time of day, season, and customer's characteristic energy usage; whereby the additional data may serve to best determine the extent of the excess energy capacity.

7. The hydroelectric power generation system of claim 1 including a first configurating the primary tidal reservoir as a first artificial concavity at least partially surrounded by a barrage having the primary tideway coupled with the oceanic source of tidal energy; a first delivering the tidal drift currents through the primary tideway for driving the first hydrodynamic engine and first generator apparatus; a second configurating the secondary tidal reservoir as a second artificial concavity at least partially surrounded by a barrage and having the sluice gate controlled secondary tideway coupled with the oceanic source of tidal energy; a second delivering the virtual tidal drift currents through the gradated management of the sluice gate controlled secondary tideway for driving the second hydrodynamic engine and second generator apparatus.

8. The hydroelectric power generation system of claim 1 including a first maximizing of an inflowing of tidal water through the primary tideway to topmost the water level captured in the primary tidal reservoir prior to a first reckoning of an onset of the oceanic tidal source ebb tide quadrant succeeding a high-tide slack water quadrant; and, a second maximizing of an outflowing of the virtual tidal flow through the secondary tideway to bottommost the water level captured in the primary tidal reservoir prior to a second reckoning of an onset of the oceanic tidal source flood tide quadrant succeeding a low-tide slack water quadrant; whereby the effect is to fully fill the primary tidal reservoir by the time the ebb tide resumes substantial reflux flow through the first tideway and to fully deplete the primary tidal reservoir by the time the flood tide resumes substantial influx flow through the first tideway.

9. The hydroelectric power generation system of claim 1 including a gradated modulation of the proportioned opening and closing of the sluice gate to urge a gradated change of influx and reflux of the virtual tidal flow capacity of the secondary tidal reservoir in a determinable extent proportional to a waxing and waning of a natural tidal drift of the oceanic source of tidal energy through the primary tideway; whereby, the natural tidal drift and virtual tidal drift combine to urge a corroborant level of hydrodynamic energy through the hydrodynamic engines, resulting in a stabile production of hydroelectric power throughout all the quadrants of the diurnal tide-cycle.

10. A hydroelectric power generation method utilizing an oceanic source of tidal energy to produce a constant source of electric power, comprising:

first initializing a primary tidal reservoir level approaching an anterior low slack-tide water level;

second initializing a secondary tidal reservoir level approaching an anterior low slack-tide water level;

first driving a first turbine apparatus from a first influx of oceanic flood tidewater flowing through a primary tideway from the oceanic source to the primary tidal reservoir;

first finding a first decrease of the first influx through the primary tideway as a high slack-tide is neared;

first metering a gradated opening of a secondary tideway between the oceanic source and the secondary tidal reservoir to urge a second influx of virtual flood tidewater proportional to the first found decrease of the first influx of the oceanic tidewater through the primary tideway;

second driving a second turbine apparatus from the second influx of virtual flood-tide flowing through the secondary tideway from the oceanic source into the secondary tidal reservoir throughout a first period of the high slack-tide;

second finding an increasing reflux of oceanic ebb tide as the first period of the high slack-tide finishes;

second metering a gradated closure of the secondary tideway in proportion to the found increase of a reflux tidewater flow through the primary tideway;

the first driving of the first turbine apparatus from the first reflux of oceanic-ebb tidewater flowing through the primary tideway from the primary tidal reservoir to the oceanic source;

first commanding closure of the secondary tideway to maintain the secondary tidal reservoir at a virtual high slack-tide water level throughout a major portion of the oceanic ebb tidewater period;

third finding a second decrease of the first reflux through the primary tideway as a low slack-tide is neared;

third metering a gradated opening of the secondary tideway to urge a second reflux of virtual-ebb tidewater flow in proportion to the third found decrease of the first reflux tidewater flow through the primary tideway;

the second driving of the second turbine apparatus from the second reflux of virtual ebb tidewater flowing through the secondary tideway from the secondary tidal reservoir to the oceanic source throughout a second period of the low slack-tide;

fourth finding an increasing influx of the oceanic flood tidewater as the second period of the low slack-tide finishes;

fourth metering a gradated closure of the secondary tideway in proportion to an increase in the oceanic flood tidewater flow through the primary tideway; and, the second commanding closure of the secondary tideway and maintaining of the secondary tidal reservoir near the low slack-tide water level during the first influx of the oceanic flood tidewater;

whereby an interchange of the oceanic tidewater flow between the oceanic source and the primary tidal reservoir first drives the first turbine apparatus and a first generator apparatus during periods of substantial flood tidewater and ebb tidewater flow through the primary tideway and the secondary tideway is utile to provide a gradated interchange of a virtual tidewater flow between the oceanic source and the secondary tidal reservoir during the high slack-tide and the low slack-tide that is utilized to second drive the second turbine apparatus and a second generator apparatus and transmute the oceanic source of tidal energy into a steady flow of electric power throughout a diurnal tide-cycle.

11. The hydroelectric power generation method of claim 10 further comprising:

stationing a sluice gate in the secondary tideway to provide a gradated flow-rate control of a watercourse flowing between the oceanic source and the secondary tidal reservoir.

12. The hydroelectric power generation method of claim 11 further comprising:

first configurating the primary tidal reservoir as a first artificial concavity at least partially surrounded by a barrage having the primary tideway coupled with the oceanic source of tidal energy;

second configurating the secondary tidal reservoir as a second artificial concavity at least partially surrounded by a barrage and including the sluice gate controlled secondary tideway coupled with the oceanic source of tidal energy; and, routing the oceanic source of waxing and waning tidewater current drift through the primary tideway for effectually driving the first turbine apparatus and a gradated virtual tidewater flow through the secondary tideway for effectually driving the second turbine apparatus.

13. The hydroelectric power generation method of claim 11 further comprising:

finding an excess energy capacity beyond present expected load demand;

first utilizing an excess of the first tidewater flow energy capacity to first pump the primary tidal reservoir near a level of a next slack-tidewater level; and, second utilizing an excess level of the virtual tidewater flow energy capacity to second pump the primary tidal reservoir to a level of an immediate slack-tidewater level;

whereby the excess energy capacity beyond the present demand is stored by the primary tidal reservoir and available as a potential energy capacity for a next quadrant of the diurnal tide-cycle.

14. A hydroelectric power generation method utilizing an oceanic source of tidal energy to produce a constant source of electric power, comprising:

first initializing a primary tidal reservoir near an anterior low slack-tide water level;

second initializing a secondary tidal reservoir near the anterior low slack-tide water level;

third initializing a tertiary tidal reservoir near the anterior low slack-tide water level;

first driving a first turbine and generator apparatus from a first influx of oceanic flood tidewater first flowing through a primary tideway from the oceanic source to the primary tidal reservoir;

first finding a decrease of the first influx through the primary tideway as a high slack-tide of the oceanic source is neared;

first metering a gradated opening of a secondary tideway between the oceanic source and the secondary tidal reservoir to urge a second influx of tidewater proportional to an extent of the first found decrease of the first influx through the primary tideway;

second driving a second turbine and generator apparatus from the second influx of flood tidewater second flowing through the secondary tideway from the oceanic source into the secondary tidal reservoir during a first period of the high slack-tide;

second finding a decrease of the second influx of the flood tidewater second flowing through the secondary tideway during the first period of the high slack-tide;

second metering a gradated opening of the tertiary tideway between the oceanic source and the tertiary tidal reservoir to urge a third influx of tidewater proportional to an extent of the second found decrease of the influx of the second flowing through the secondary tideway;

third driving a third turbine and generator apparatus from the third influx of tidewater third flowing through the tertiary tideway from the oceanic source to the tertiary tidal reservoir for a remaining period of the high slack-tide;

third finding an initial and an increasing reflux of oceanic ebb tidewater as the first period of the high slack-tide finishes;

first commanding closure of the secondary tideway upon the third found initial reflux of the oceanic ebb tidewater and maintain the secondary tidal reservoir at a virtual high slack-tider level;

third metering a gradated closure of the tertiary tideway in proportion to the third found increase of a first reflux of tidewater first flowing through the primary tideway;

the first driving of the first turbine and generator apparatus from the first reflux of the tidewater first flowing through the primary tideway from the primary tidal reservoir to the oceanic source;

second commanding closure of the tertiary tideway to maintain the tertiary tidal reservoir at the virtual high slack-tide water level throughout a major portion of the ebb tide period;

fourth finding a decrease of the first reflux through the primary tideway as the second period of a low slack-tide approaches;

fourth metering a gradated opening of the tertiary tideway to urge a tertiary reflux of virtual ebb tidewater in proportion to the fourth found decrease of the reflux tidewater first flowing through the primary tideway;

the third driving of the third turbine and generator apparatus from the tertiary reflux of ebb tidewater third flowing through the tertiary tideway from the tertiary tidal reservoir to the oceanic source during the second period of the low slack-tide;

fifth finding a decrease of the tertiary reflux of ebb tidewater third flowing through the tertiary tideway during the second period of the low slack-tide;

fifth metering a gradated opening of the secondary tideway between the secondary tidal reservoir and the oceanic source to urge a reflux of ebbing tidewater to second flow through the secondary tideway in proportion to the fifth found decrease of the tertiary reflux tidewater third flowing through the tertiary tideway;

the second driving of the second turbine and generator apparatus from the reflux of ebbing tidewater second flowing through the secondary tideway;

sixth finding an initial and an increasing influx of the flood tidewater as the second period of the low slack-tide finishes;

third commanding closure of the tertiary tideway upon the sixth found initial influx of the flood tidewater and maintain the tertiary tidal reservoir at a virtual low slack-tide water level;

sixth metering a gradated closure of the secondary tideway in proportion to a sixth found flood tidewater drift increase through the primary tideway; and, fourth commanding closure of the secondary tideway and maintaining of the secondary tidal reservoir at the virtual low slack-tide water level during the first influx of the flood tidewater;

whereby an interchange of the oceanic tidewater flow between the oceanic source and the primary tidal reservoir drives the first turbine and generator apparatus during periods of substantial flood tide drift and ebb tide drift and a secondary tidal reservoir is utile to provide a gradated interchange of a first virtual tidewater flow during an early portion of the high slack-tide and a tertiary tidal reservoir is utile to provide a gradated interchange of second virtual tidewater flow during a final portion of the high slack-tide and alternatively the tertiary tidal reservoir is utile to provide the gradated interchange of the second virtual tidewater flow during the early portion of the low slack-tide and the secondary tidal reservoir is utile to provide the gradated interchange of the first virtual tidewater flow during a final portion of the low slack-tide, with individual tideflow events driving the first, second and third turbine and generator apparatus collectively transmuting the oceanic tidal energy into the constant source of electric power throughout a diurnal tide-cycle.

15. The hydroelectric power generation method of claim 14 further comprising:

stationing a first sluice gate in the secondary tideway to provide a controlled flow-rate of a watercourse second flowing between the oceanic source and the secondary tidal reservoir;

stationing a second sluice gate in the tertiary tideway to provide a controlled flow-rate of a watercourse third flowing between the oceanic source and the tertiary tidal reservoir.

16. The hydroelectric power generation method of claim 15 further comprising:

first configurating the primary tidal reservoir as a first artificial concavity at least partially surrounded by a barrage having the primary tideway coupled with the oceanic source of tidal energy;

second configurating the secondary tidal reservoir as a second artificial concavity at least partially surrounded by a barrage and including the first sluice gate controlled secondary tideway coupled with the oceanic source of tidal energy;

third configurating the tertiary tidal reservoir as a third artificial concavity at least partially surrounded by a barrage and including the second sluice gate controlled tertiary tideway coupled with the oceanic source of tidal energy; and, routing the oceanic tidewater drift current through the primary tideway for effectually driving the first turbine apparatus, through the secondary tideway under the gradated control of the first sluice gate for driving the second turbine apparatus and through the tertiary tideway under the gradated control of the second sluice gate for driving the third turbine apparatus.

17. The hydroelectric power generation method of claim 14 further comprising:

presently experiencing a reduced load demand of the electric power less than a full generating capacity;

first operating a pump during a period of flood tide influx experiencing the reduced load demand to transfer an excess portion of available flood tide influx to complement attaining the high slack level tide water level in the primary tidal reservoir;

second operating a pump during the first period of the high slack-tide and virtual flood tide flow experiencing the reduced load demand to transfer an excess portion of the virtual flood tide flow during oceanic high slack-tide to complement attaining the level of the virtual high slack-tide water level next-stored in the secondary tidal reservoir;

third operating a pump during a period of ebb tide experiencing the reduced power demand to transfer an excess portion of reflux tidewater ordinarily first flowing forth from the primary tidal reservoir to the oceanic source;

fourth operating the pump during the second period of the low slack-tide and virtual ebb tide second flowing through the secondary tideway to transfer the excess portion of virtual ebb tide second flowing forth from the secondary tidal reservoir directly to the oceanic source.

18. The hydroelectric power generation method of claim 14 further comprising:

independently operating the first, second and third turbine and generator apparatus to produce varying levels of electric power PA to a load;

satisfying a power demand formulation where:

$$GA+GB+GC=PA$$

where: GA=output of the first turbine and generator apparatus;
GB=output of the second turbine and generator apparatus;
GC=output of the third turbine and generator apparatus;
PA=available power delivered to a user load;

sensing rotational rate data for preferably each one of the several turbine and generator apparatus;

processing the sensed rotational rate data into an excitation control signal for modulating an immediate excitation level of preferably each one of the several generators to control output delivery GA, GB and GC;

transmuting a near constant summation of available power level PA from an aggregation of individual generator power levels GA, GB and GC;

delivering the near constant power level PA to the user load.

19. The hydroelectric power generation method of claim 14 further comprising:

alternating usage precedence of the secondary tidal reservoir and the tertiary tidal reservoir during successive diurnal tide cycles to assure that the second turbine apparatus and the third turbine apparatus are each alternately supplied with a substantially uniform and maximal level of hydrodynamic tidal energy;

whereby the precedence of the secondary tidal reservoir and the tertiary tidal reservoir become alternately exchanged during successive diurnal tide cycles to garner maximal hydrodynamic energy reserves to complement the hydrodynamic energy capability of the primary tidal basin.

20. The hydroelectric power generation system of claim 14 further comprising:

determining an excess electric power production capacity beyond a presently measured load demand;

first bypassing an excess of the oceanic tidewater flow around the first hydrodynamic engine to a first extent necessary to urge a reduction of the electric power production capacity to better match the presently measured load demand;

first supplementing a reaching of the next slack-tide water level of the primary tidal reservoir with the first bypassed portion of the first tidewater flow;

second bypassing an excess of the virtual tidewater flow around the second hydrodynamic engine to a second extent necessary to urge the reduction of the electric power production capacity to better match the presently measured load demand;

second supplementing a reaching of the next slack-tide water level of the secondary tidal reservoir with the second bypassed portion of the virtual tidewater flow;

whereby the excess power production capacity determined during oceanic tide water flow is advanced to supplement the tidal energy reserve of the primary tidal reservoir available during a next operating quadrant and the excess power production capacity determined during the virtual-tide water flow is advanced to supplement the virtual-tide energy reserve of the secondary tidal reservoir available during the next operating quadrant.

* * * * *